US010682665B2

(12) United States Patent
Pringle, IV et al.

(10) Patent No.: US 10,682,665 B2
(45) Date of Patent: Jun. 16, 2020

(54) METHODS OF APPLYING GLUTINOUS SUBSTANCES

(71) Applicant: The Boeing Company, Chicago, IL (US)

(72) Inventors: John W. Pringle, IV, Gardena, CA (US); John J. Brown, Costa Mesa, CA (US); Angelica Davancens, Reseda, CA (US); Frederick B. Frontiera, Mt. Pleasant, SC (US); Martin Guirguis, Long Beach, CA (US); Raul Tomuta, Stanton, CA (US); Richard P. Topf, Orange, CA (US); Don D. Trend, Huntington Beach, CA (US); Jake B. Weinmann, Signal Hill, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/059,737

(22) Filed: Aug. 9, 2018

(65) Prior Publication Data
US 2018/0345311 A1 Dec. 6, 2018

Related U.S. Application Data

(62) Division of application No. 15/009,452, filed on Jan. 28, 2016, now Pat. No. 10,099,240.

(Continued)

(51) Int. Cl.
*B05C 9/02* (2006.01)
*B05C 5/02* (2006.01)
(Continued)

(52) U.S. Cl.
CPC .............. *B05C 9/02* (2013.01); *A46B 11/06* (2013.01); *A46B 13/04* (2013.01); *B05C 5/02* (2013.01);
(Continued)

(58) Field of Classification Search
CPC ... A46B 11/002; A46B 11/0065; A46B 13/04; B05C 1/06; B05C 5/02; B05C 11/10; B05C 11/1002; B05C 11/1026; B05C 11/1013
See application file for complete search history.

(56) References Cited

U.S. PATENT DOCUMENTS

| 4,067,476 A | 1/1978 | Moline et al. |
| 4,808,063 A | 2/1989 | Haley et al. |

(Continued)

FOREIGN PATENT DOCUMENTS

| CN | 1353628 | 6/2002 |
| CN | 1757438 | 4/2006 |

(Continued)

OTHER PUBLICATIONS

Aerospace Dispensing Systems, Fori's New Aerospace Division Blog dated Oct. 3, 2013, http://fori-aerospace.blogspot.com/2013/10/aerospace-dispensing-systems.html, Fori Automation, Inc., accessed Jun. 2, 2016.

(Continued)

*Primary Examiner* — David P Angwin
*Assistant Examiner* — Bradley S Oliver
(74) *Attorney, Agent, or Firm* — Kunzler Bean & Adamson

(57) ABSTRACT

A method of delivering a glutinous substance from a cartridge to a brush comprises receiving the cartridge inside a sleeve through an inlet of the sleeve while a pressure cap, located proximate the inlet of the sleeve, is in an open position. The method also comprises moving the pressure cap, located proximate the inlet of the sleeve, into a closed position to sealingly couple the pressure cap with a trailing end of the cartridge and to sealingly couple a valve with a leading end of the cartridge. The method further comprises (Continued)

applying pressure to the glutinous substance in the cartridge through a pressure input of the pressure cap to urge the glutinous substance from the cartridge to the valve. The method additionally comprises rotating the brush and opening the valve to enable the glutinous substance to flow from the valve to the brush at least when the brush is rotating.

23 Claims, 16 Drawing Sheets

Related U.S. Application Data

(60) Provisional application No. 62/242,216, filed on Oct. 15, 2015.

(51) Int. Cl.

| | | |
|---|---|---|
| B05D 7/24 | (2006.01) | |
| B05C 11/10 | (2006.01) | |
| A46B 13/04 | (2006.01) | |
| A46B 11/06 | (2006.01) | |
| B05C 1/06 | (2006.01) | |
| B05C 1/02 | (2006.01) | |
| B25J 15/04 | (2006.01) | |
| B23Q 3/155 | (2006.01) | |
| B25J 9/16 | (2006.01) | |
| B25J 11/00 | (2006.01) | |

(52) U.S. Cl.
CPC .......... *B05C 11/10* (2013.01); *B05C 11/1002* (2013.01); *B05D 7/24* (2013.01); *B23Q 3/15566* (2013.01); *B25J 9/1679* (2013.01); *B25J 9/1692* (2013.01); *B25J 11/0075* (2013.01); *B25J 15/0491* (2013.01); *B05C 1/027* (2013.01); *B05C 1/06* (2013.01); *B23Q 2003/15537* (2016.11); *Y10S 483/901* (2013.01); *Y10S 901/02* (2013.01); *Y10S 901/43* (2013.01); *Y10T 483/17* (2015.01)

(56) References Cited

U.S. PATENT DOCUMENTS

| | | | |
|---|---|---|---|
| 5,102,010 A * | 4/1992 | Osgar | B65D 47/36 |
| | | | 222/1 |
| 5,171,095 A | 12/1992 | Davies et al. | |
| 5,452,824 A | 9/1995 | Danek et al. | |
| 5,680,967 A | 10/1997 | Dang et al. | |
| 5,857,796 A | 1/1999 | Waldmann | |
| 5,863,146 A | 1/1999 | Denkins et al. | |
| 6,082,597 A | 7/2000 | Beckett et al. | |
| 6,223,941 B1 | 5/2001 | Nealey et al. | |
| 7,020,539 B1 * | 3/2006 | Kovacevic | B22F 3/1055 |
| | | | 700/166 |
| 7,922,107 B2 | 4/2011 | Fox | |
| 8,651,046 B1 | 2/2014 | Davancens et al. | |
| 9,937,516 B2 | 4/2018 | Tomuta et al. | |
| 2007/0280776 A1 | 12/2007 | Castellana | |
| 2009/0008398 A1 * | 1/2009 | Nakatsuji | B05C 5/0216 |
| | | | 220/737 |
| 2009/0080964 A1 | 3/2009 | Castellana | |
| 2012/0325864 A1 * | 12/2012 | Imaizumi | B05C 5/0225 |
| | | | 222/333 |
| 2014/0158717 A1 | 6/2014 | Ettlin | |
| 2014/0234011 A1 * | 8/2014 | Tomuta | B05B 13/0431 |
| | | | 401/289 |
| 2015/0028051 A1 | 1/2015 | Topf et al. | |
| 2015/0064357 A1 | 3/2015 | Tomuta et al. | |
| 2015/0083751 A1 | 3/2015 | Aigner et al. | |
| 2016/0361734 A1 | 12/2016 | Routen | |
| 2017/0105514 A1 | 4/2017 | Tomuta et al. | |
| 2017/0106401 A1 | 4/2017 | Pringle et al. | |
| 2017/0106402 A1 | 4/2017 | Pringle et al. | |

FOREIGN PATENT DOCUMENTS

| | | |
|---|---|---|
| CN | 201618665 | 11/2010 |
| CN | 103567120 | 2/2014 |
| CN | 204182532 | 3/2015 |
| CN | 204523390 | 8/2015 |
| DE | 102008039804 | 2/2010 |
| EP | 2842457 | 3/2015 |
| JP | 2014061517 | 4/2014 |

OTHER PUBLICATIONS

Extended European Search Report for EP Application No. 16193053.2 dated Mar. 2, 2017.
Extended European Search Report for EP Application No. 16193055.7 dated Mar. 6, 2017.
Notice of Allowance for U.S. Appl. No. 15/143,235 dated Nov. 29, 2017.
Notice of Allowance for U.S. Appl. No. 15/009,431 dated Mar. 15, 2018.
Chinese Office Action for CN Patent Application No. 201610899187.2 dated Feb. 3, 2020.
Chinese Office Action for CN Patent Application No. 201610899745.5 dated Feb. 6, 2020.
Chinese Office Action for CN Patent Application No. 201610898893.5 dated Feb. 3, 2020.

* cited by examiner

302 — RECEIVING THE CARTRIDGE (166) INSIDE A SLEEVE (106) THROUGH AN INLET (124) OF THE SLEEVE (106) WHILE A PRESSURE CAP (110), LOCATED PROXIMATE THE INLET (124) OF THE SLEEVE (106), IS IN AN OPEN POSITION, WHEREIN THE CARTRIDGE (166) HAS A LEADING END (167) AND A TRAILING END (169)

300

304 — MOVING THE PRESSURE CAP (110), LOCATED PROXIMATE THE INLET (124) OF THE SLEEVE (106), INTO A CLOSED POSITION TO SEALINGLY COUPLE THE PRESSURE CAP (110) WITH THE TRAILING END (169) OF THE CARTRIDGE (166) AND TO SEALINGLY COUPLE A VALVE (154) WITH THE LEADING END (167) OF THE CARTRIDGE (166)

312 — THE PRESSURE CAP (110) IS PIVOTALLY COUPLED TO AN ARM (115)

314 — ROTATING THE ARM (115) IN A FIRST ROTATIONAL DIRECTION ABOUT AN AXIS (117), FIXED RELATIVE TO THE SLEEVE (106) AND PERPENDICULAR TO A CENTRAL AXIS (121) OF THE SLEEVE (106)

316 — PIVOTALLY BIASING THE PRESSURE CAP (110) RELATIVE TO THE ARM (115)

318 — PNEUMATICALLY CAUSING AN ACTUATOR (114), COUPLED TO THE PRESSURE CAP (110), TO HAVE A FIRST LENGTH

306 — APPLYING PRESSURE TO THE GLUTINOUS SUBSTANCE (168) IN THE CARTRIDGE (166) THROUGH A PRESSURE INPUT (118) OF THE PRESSURE CAP (110) TO URGE THE GLUTINOUS SUBSTANCE (168) FROM THE CARTRIDGE (166) TO THE VALVE (154)

320 — INTRODUCING A PRESSURIZED GAS INTO THE CARTRIDGE (166) THROUGH THE PRESSURE INPUT (118)

308 — ROTATING THE BRUSH (298)

310 — OPENING THE VALVE (154) TO ENABLE THE GLUTINOUS SUBSTANCE (168) TO FLOW FROM THE VALVE (154) TO THE BRUSH (298) AT LEAST WHEN THE BRUSH (298) IS ROTATING

322 —
324 — RELEASABLY LOCKING THE PRESSURE CAP (110) IN THE CLOSED POSITION

326 — MECHANICALLY LOCKING THE PRESSURE CAP (110) IN THE CLOSED POSITION

A LOCK MECHANISM (112) IS USED TO MECHANICALLY LOCK THE PRESSURE CAP (110) IN THE CLOSED POSITION, AND WHEN THE LOCK MECHANISM (112) IS IN A LOCKED POSITION, THE LOCK MECHANISM (112) REMAINS IN THE LOCKED POSITION IF THE ACTUATOR (114) LOSES PRESSURE (CONT.) FIG. 13A

(CONT.)

356
├─ 358 — RELEASABLY COUPLING THE BRUSH (298) WITH THE FIRST DRIVE ELEMENT (292)
│   └─ THE FIRST DRIVE ELEMENT (292) COMPRISES INTERNAL SPLINES (149)
├─ 360 — AT LEAST PARTIALLY DEFORMING AN ENGAGEMENT PORTION (234) OF THE BRUSH (298) AGAINST THE INTERNAL SPLINES (149) OF THE FIRST DRIVE ELEMENT (292)
├─ 362 — THE FIRST DRIVE ELEMENT (292) COMPRISES AN ANNULAR INTERNAL SHOULDER (264)
└─ 364 — INSERTING THE BRUSH (298) INTO THE FIRST DRIVE ELEMENT (292) UNTIL THE BRUSH (298) CONTACTS THE ANNULAR INTERNAL SHOULDER (264)

366 — INSERTING A PORTION OF THE BRUSH (298) THROUGH THE FIRST DRIVE ELEMENT (292)

368 — RECEIVING THE PORTION OF THE BRUSH (298) IN A FIRST RECEPTACLE (205) OF A CAP (196)

370 — ROTATING THE CAP (196) ABOUT A FIRST ROTATION AXIS (187) OF THE FIRST DRIVE ELEMENT (292) TO RELEASABLY LOCK THE CAP (196) RELATIVE TO THE FIRST ROTATION AXIS (187) OF THE FIRST DRIVE ELEMENT (292)

372 — OPENING THE VALVE (154) ENABLES THE GLUTINOUS SUBSTANCE (168) TO FLOW FROM THE VALVE (154) TO THE BRUSH (298) THROUGH THE CAP (196) WHEN THE BRUSH (298) IS RELEASABLY COUPLED WITH THE FIRST DRIVE ELEMENT (292) AND WHEN THE BRUSH (298) IS ROTATING

374 — OPENING THE VALVE (154) ENABLES THE GLUTINOUS SUBSTANCE (168) TO FLOW FROM THE VALVE (154) INTO A SUBSTANCE-DELIVERY TUBE (174), COMMUNICATIVELY COUPLED TO THE BRUSH (298)

*FIG. 13C*

METHODS OF APPLYING GLUTINOUS SUBSTANCES

BACKGROUND

Glutinous substances, such as sealants, adhesives, and fillers, are applied onto surfaces of workpieces for various purposes, such as for sealing, corrosion-resistance, and fixation. Manually powered tools exist for delivering glutinous substances to a surface of a workpiece. However, the use of some manually-powered tools to apply glutinous substances onto surfaces of workpieces can lead to increases in labor, time, and inaccuracies.

SUMMARY

Accordingly, systems, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an apparatus for delivering a glutinous substance from a cartridge to a brush. The apparatus comprises a sleeve, comprising a central axis, an inlet, and an outlet opposite the inlet. The sleeve is configured to receive the cartridge through the inlet. The apparatus also comprises a pressure-cap assembly, coupled to the sleeve and comprising a pressure cap, proximate the inlet of the sleeve. With the cartridge received within the sleeve, the pressure cap is movable between, inclusively, a closed position, in which the pressure cap is in sealed engagement with a trailing end of the cartridge, and an open position, in which the pressure cap provides clearance sufficient for insertion of the cartridge inside the sleeve through the inlet. The pressure cap comprises a pressure input, selectively operable to apply pressure to the glutinous substance in the cartridge when the cartridge is received within the sleeve, the pressure cap is in the closed position, and a leading end of the cartridge is in sealed engagement with a valve. The pressure-cap assembly also comprises an actuator, coupled to the pressure cap and to the sleeve. The actuator is selectively operable to move the pressure cap relative to the sleeve between, inclusively, the closed position and the open position. Additionally, the apparatus comprises a valve interface, proximate the outlet of the sleeve. The valve interface is configured to be coupled with the valve. The apparatus further comprises a brush-arm assembly, coupled to the sleeve. The brush-arm assembly is configured to retain the brush and is capable of rotating the brush. The valve is selectively operable, when the pressure is applied to the glutinous substance in the cartridge, to enable the glutinous substance to flow from the cartridge to the brush at least when the brush-arm assembly rotates the brush.

Another example of the subject matter according to the present disclosure relates to a system for delivering a glutinous substance from a cartridge to a surface of a workpiece. The system comprises a robot, comprising a tool interface, a brush, and an apparatus for delivering the glutinous substance from the cartridge to the brush. The apparatus comprises a robot interface, configured to be coupled to the tool interface of the robot. The apparatus further comprises a sleeve, comprising a central axis, an inlet, and an outlet opposite the inlet. The sleeve is configured to receive the cartridge through the inlet. Additionally, the apparatus comprises a valve interface, coupled to the sleeve proximate the outlet of the sleeve. The apparatus also comprises a valve, configured to be coupled with the valve interface. Additionally, the apparatus comprises a pressure-cap assembly, coupled to the sleeve. The pressure-cap assembly comprises a pressure cap proximate the inlet of the sleeve. With the cartridge received within the sleeve, the pressure cap is movable between, inclusively, a closed position, in which the pressure cap is in sealed engagement with a trailing end of the cartridge, and an open position, in which the pressure cap provides clearance sufficient for insertion of the cartridge inside the sleeve through the inlet. The pressure cap comprises a pressure input, selectively operable to apply pressure to the glutinous substance in the cartridge when the cartridge is received within the sleeve, the pressure cap is in the closed position, and a leading end of the cartridge is in sealed engagement with the valve. The pressure-cap assembly also comprises an actuator, coupled to the pressure cap and to the sleeve. The actuator is selectively operable to move the pressure cap relative to the sleeve between, inclusively, the closed position and the open position. The apparatus also comprises a brush-arm assembly, coupled with the sleeve and configured to retain and rotate the brush. The valve is selectively operable, when the pressure is applied to the glutinous substance in the cartridge, to enable the glutinous substance to flow from the cartridge to the brush when the brush is releasably retained by the brush-arm assembly and when the brush-arm assembly rotates the brush.

Yet another example of the subject matter according to the present disclosure relates to a method of delivering a glutinous substance from a cartridge to a brush. The method comprises receiving the cartridge inside a sleeve through an inlet of the sleeve while a pressure cap, located proximate the inlet of the sleeve, is in an open position. The cartridge has a leading end and a trailing end. The method also comprises moving the pressure cap, located proximate the inlet of the sleeve, into a closed position to sealingly couple the pressure cap with the trailing end of the cartridge and to sealingly couple a valve with the leading end of the cartridge. Additionally, the method comprises applying pressure to the glutinous substance in the cartridge through a pressure input of the pressure cap to urge the glutinous substance from the cartridge to the valve. The method further comprises rotating the brush. The method also comprises opening the valve to enable the glutinous substance to flow from the valve to the brush at least when the brush is rotating.

BRIEF DESCRIPTION OF THE DRAWINGS

Figure 1A:
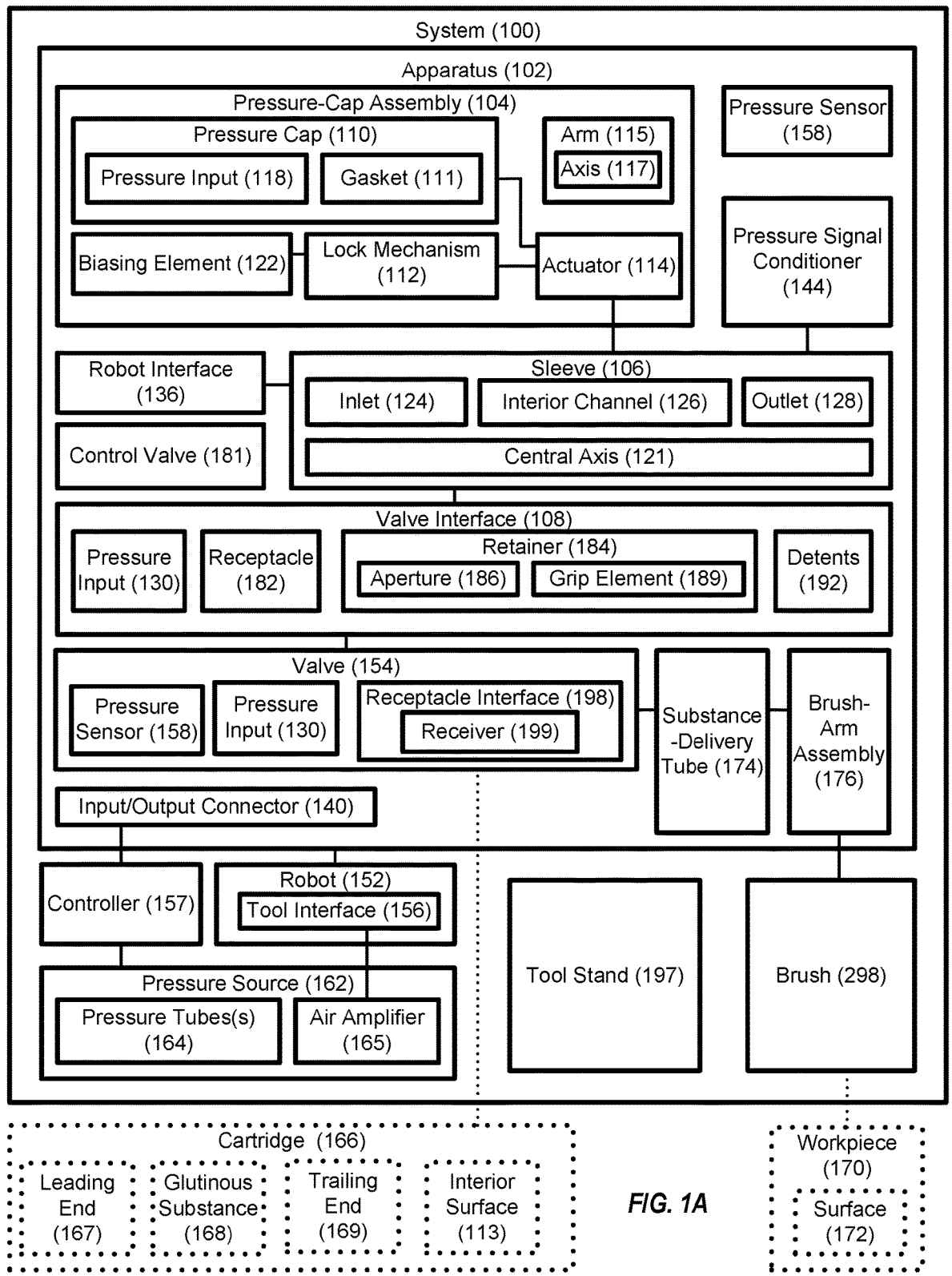
Figure 1B:
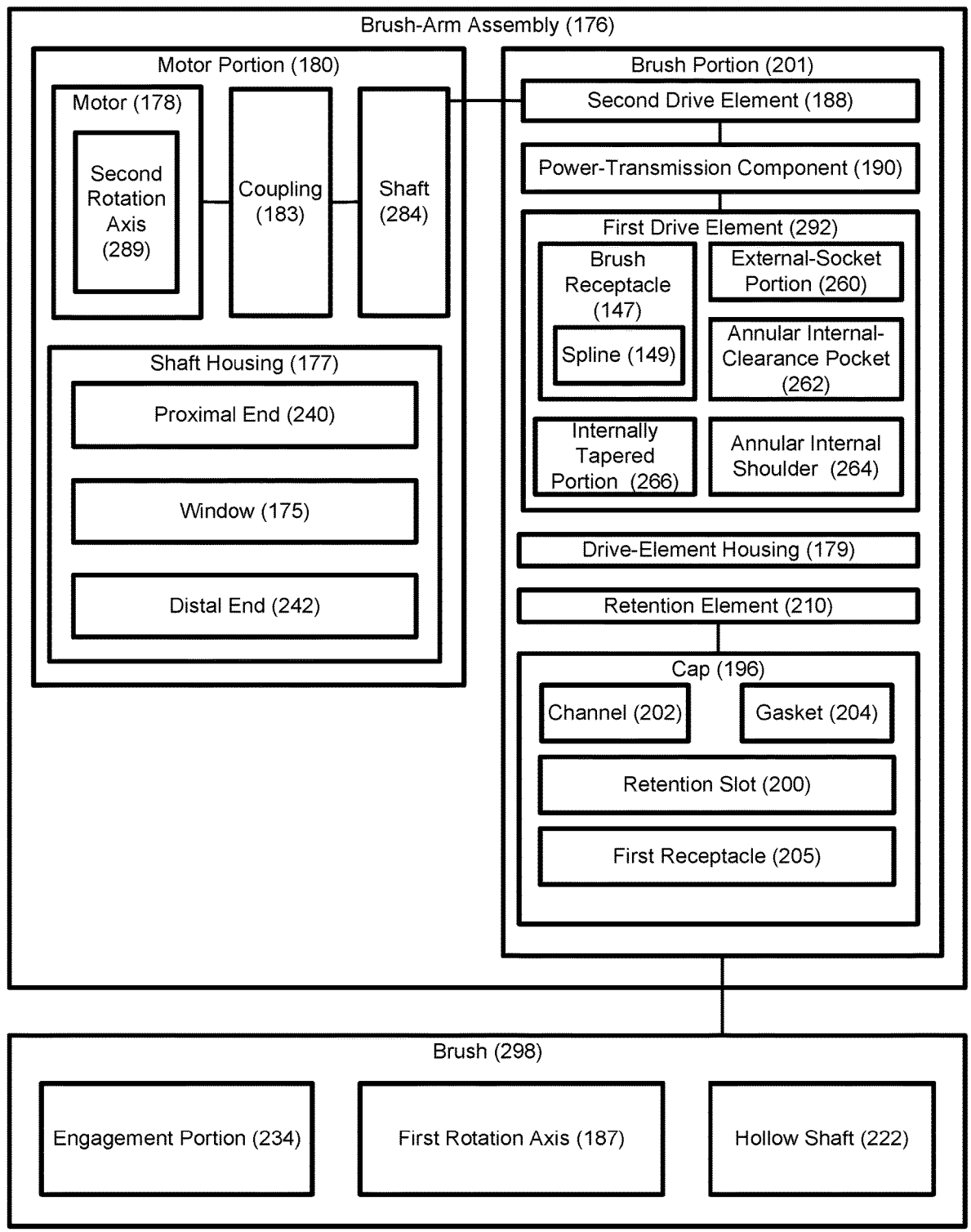
Figure 2:
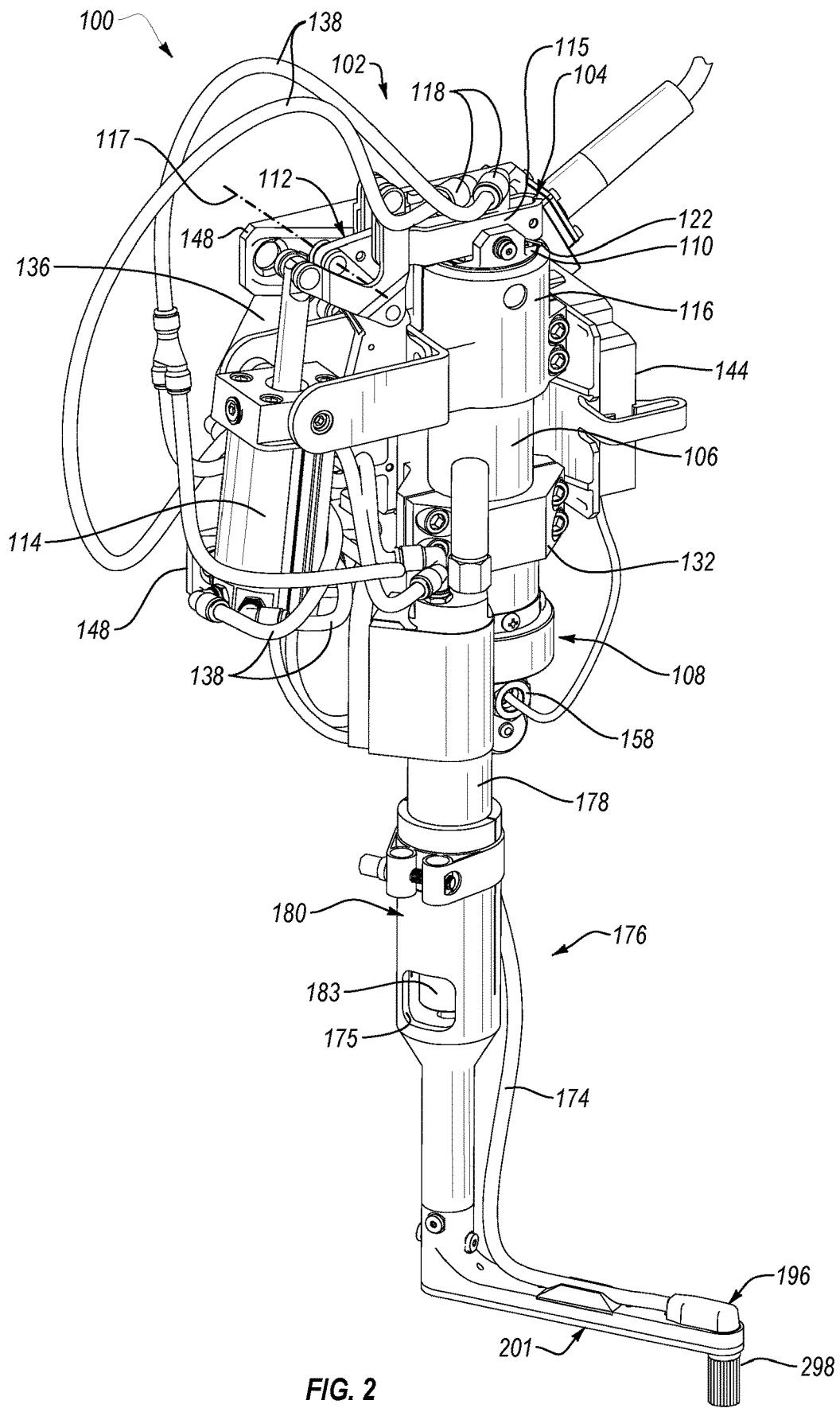
Figure 3:
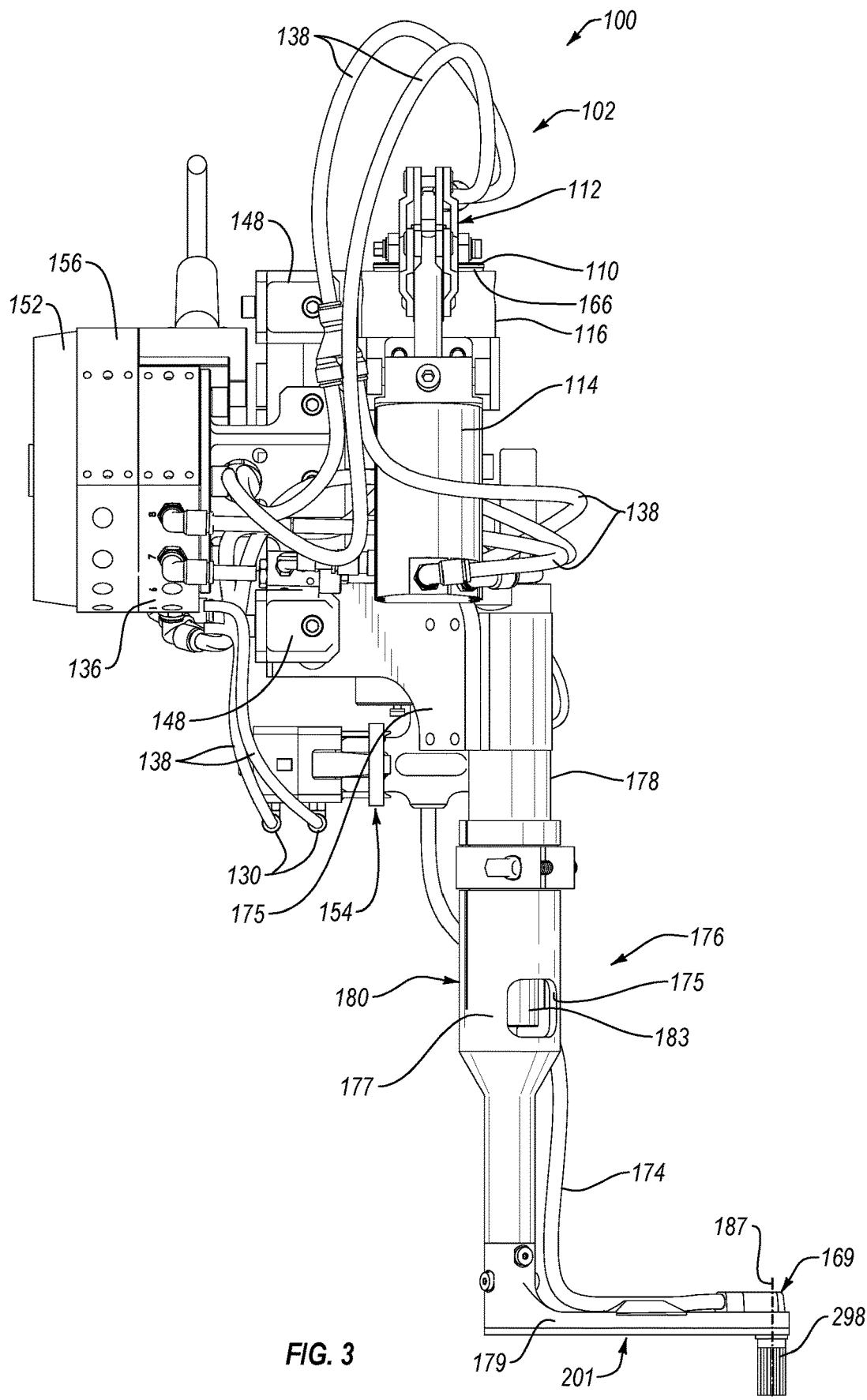
Figure 4:
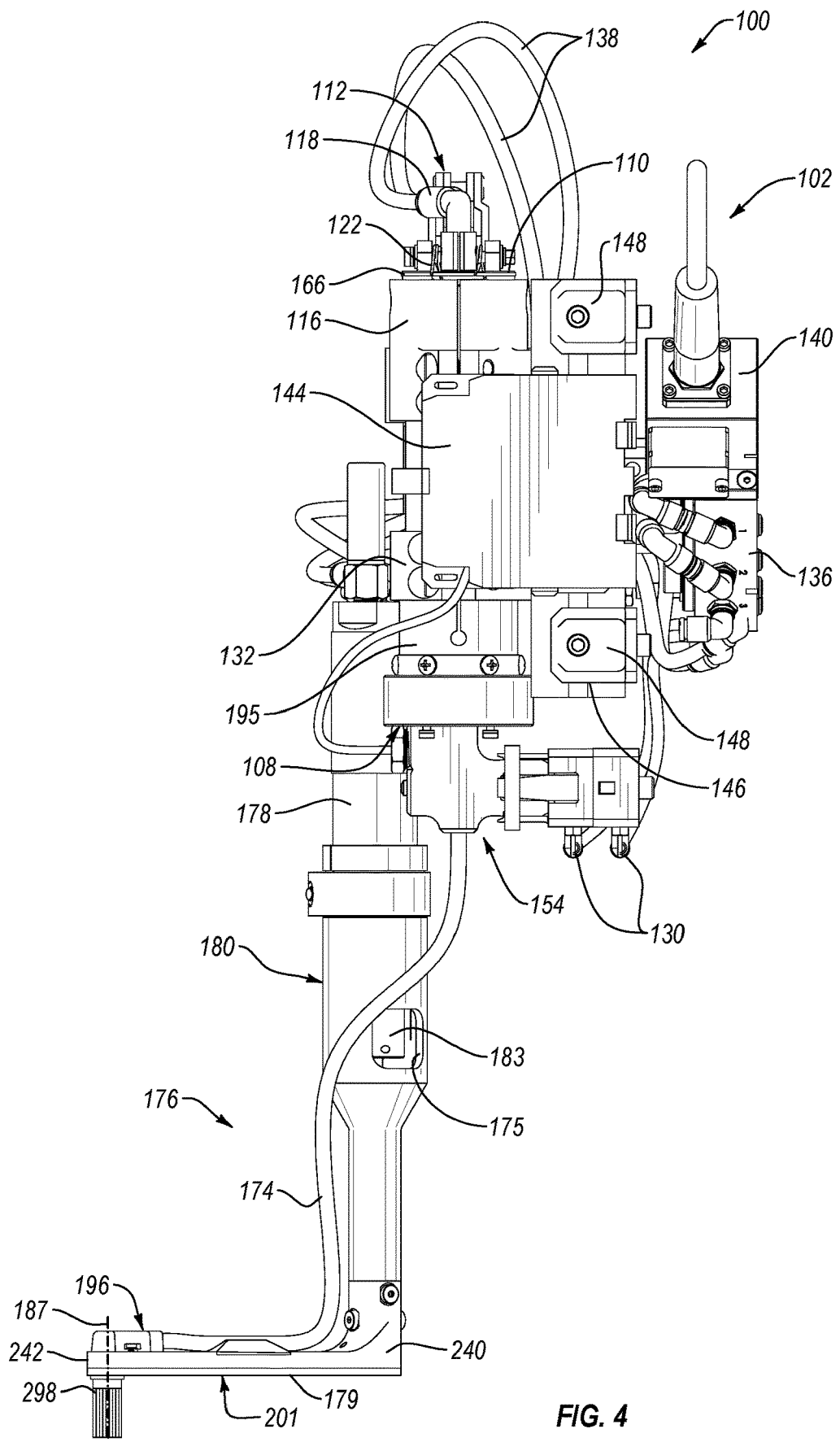
Figure 5:
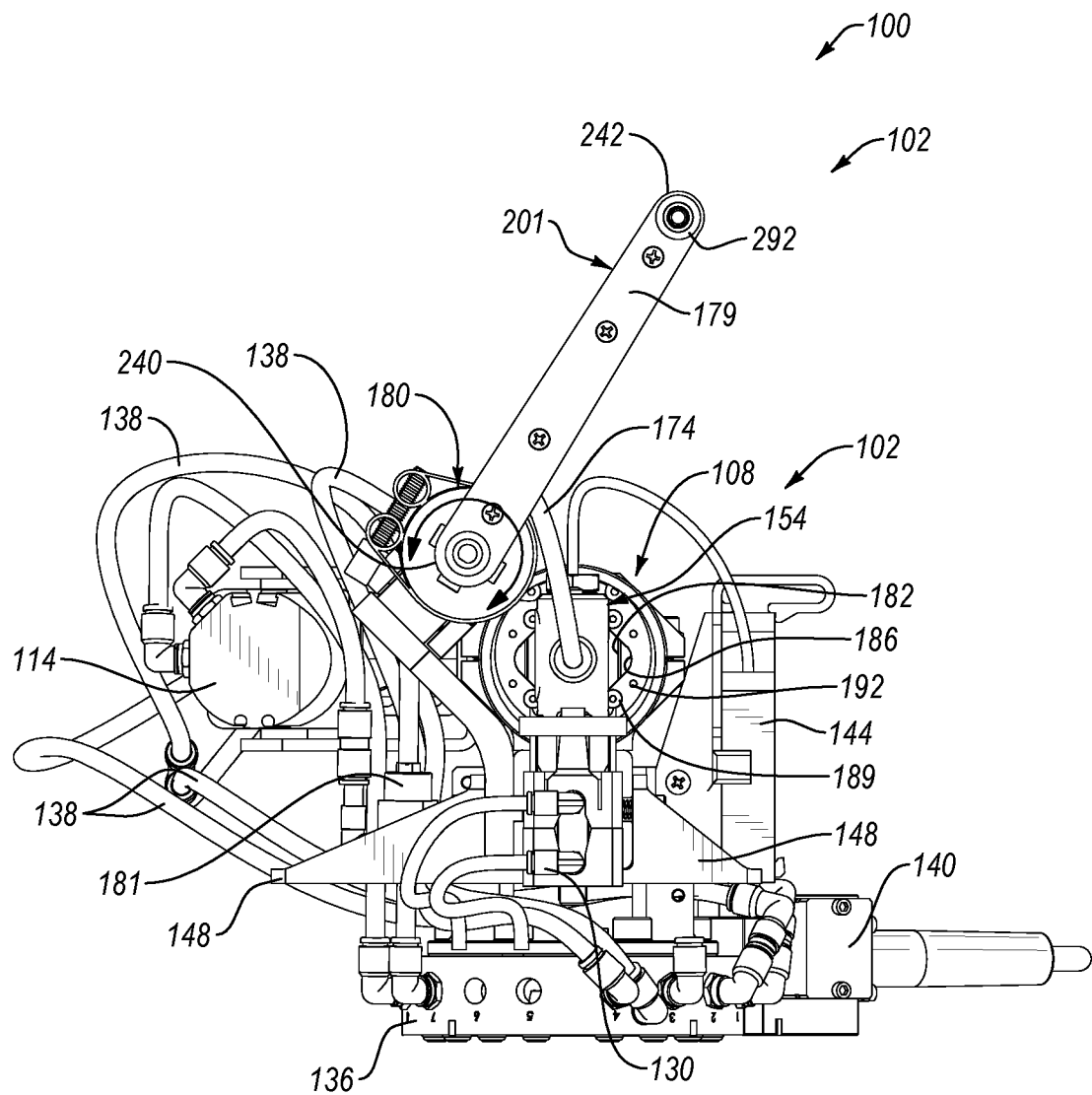
Figure 6:
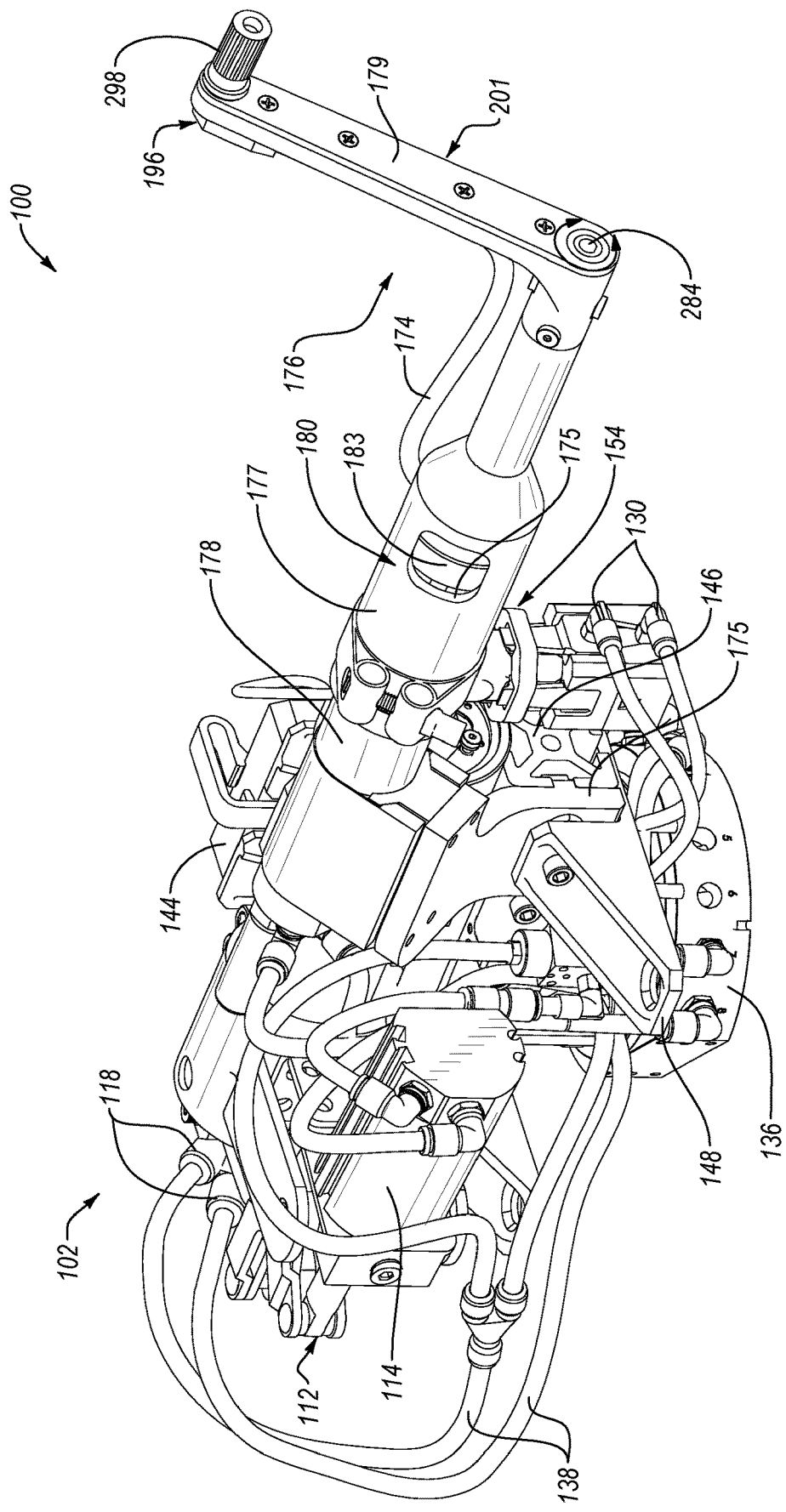
Figure 7:
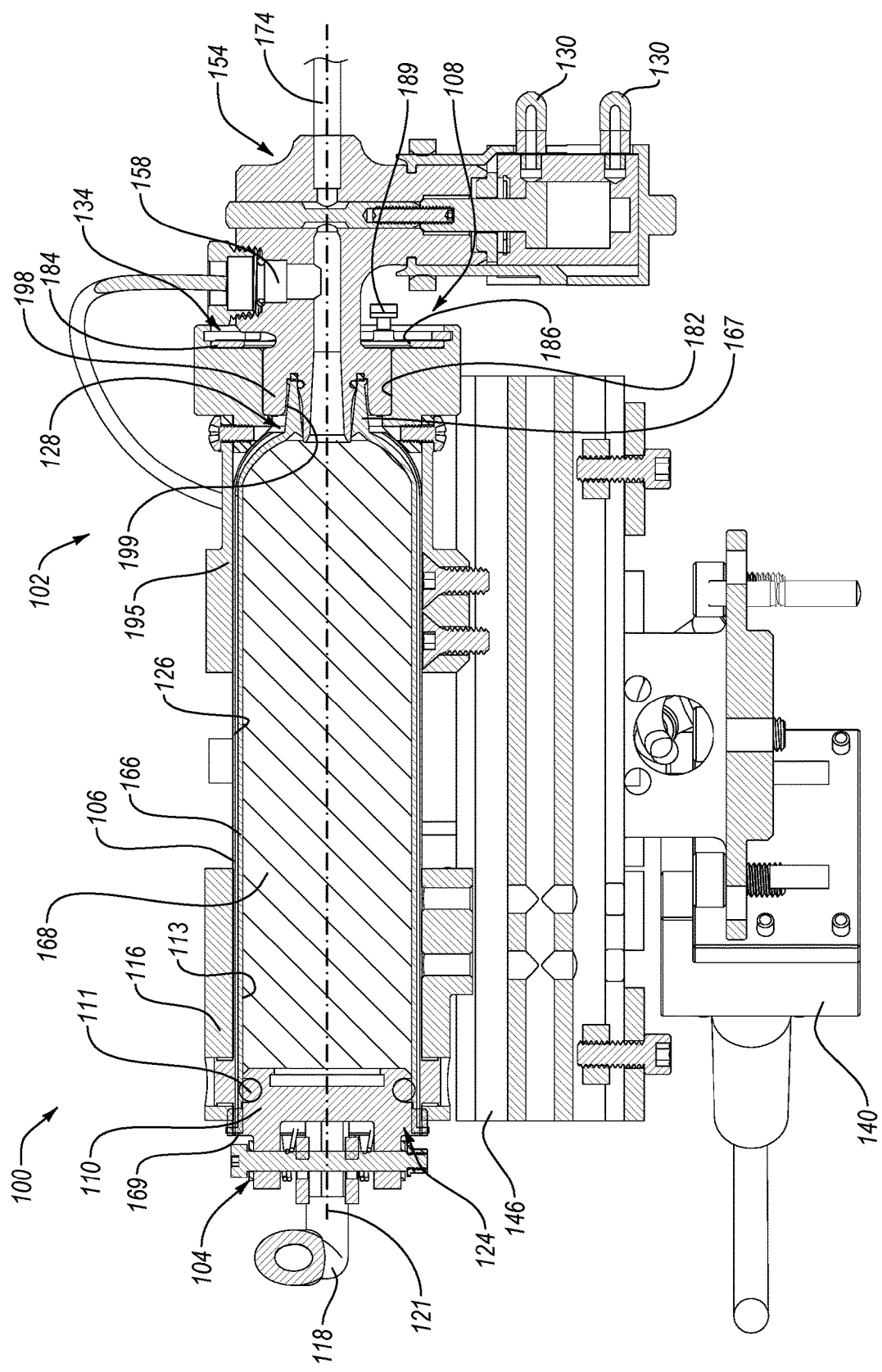
Figure 8:
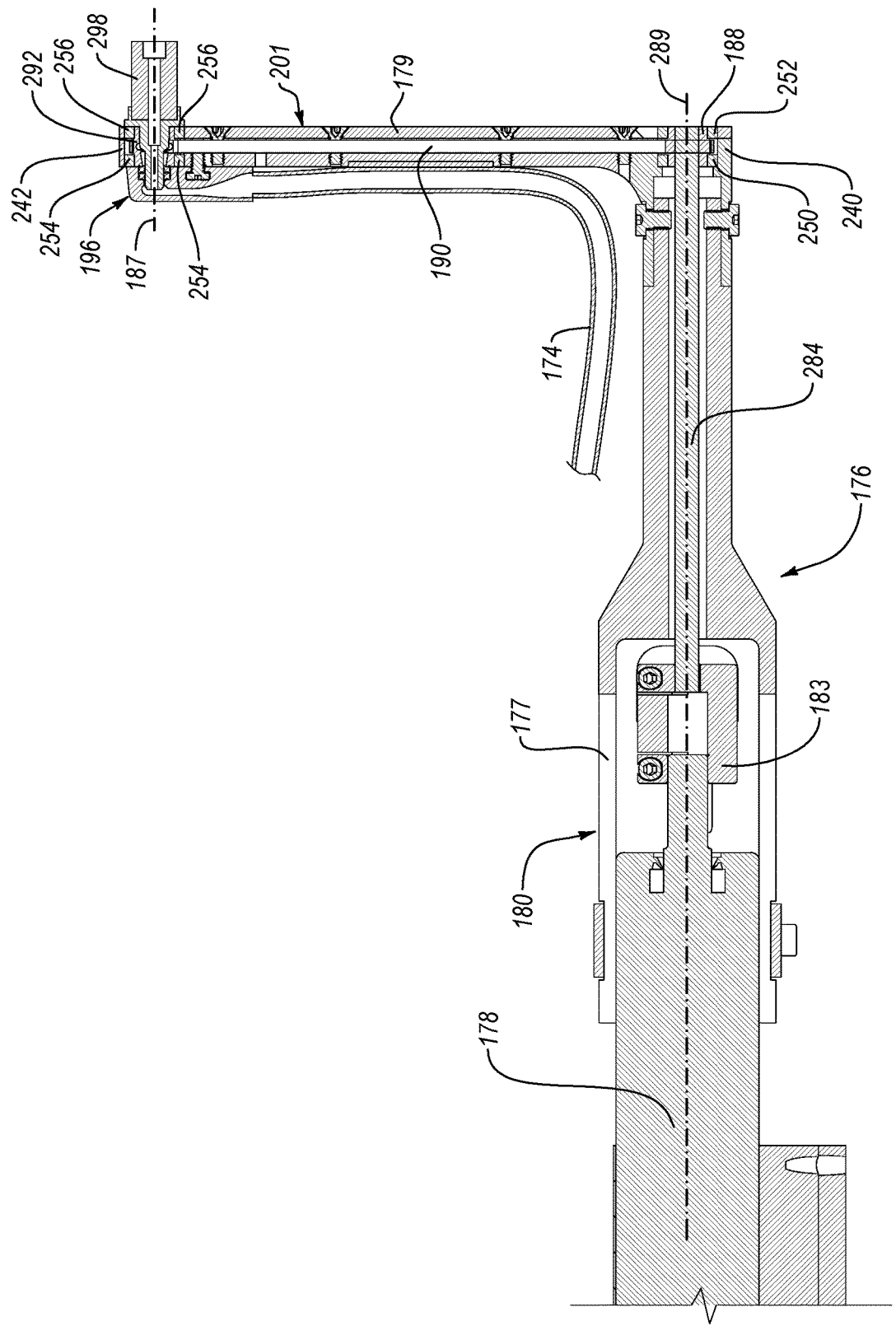
Figure 9:
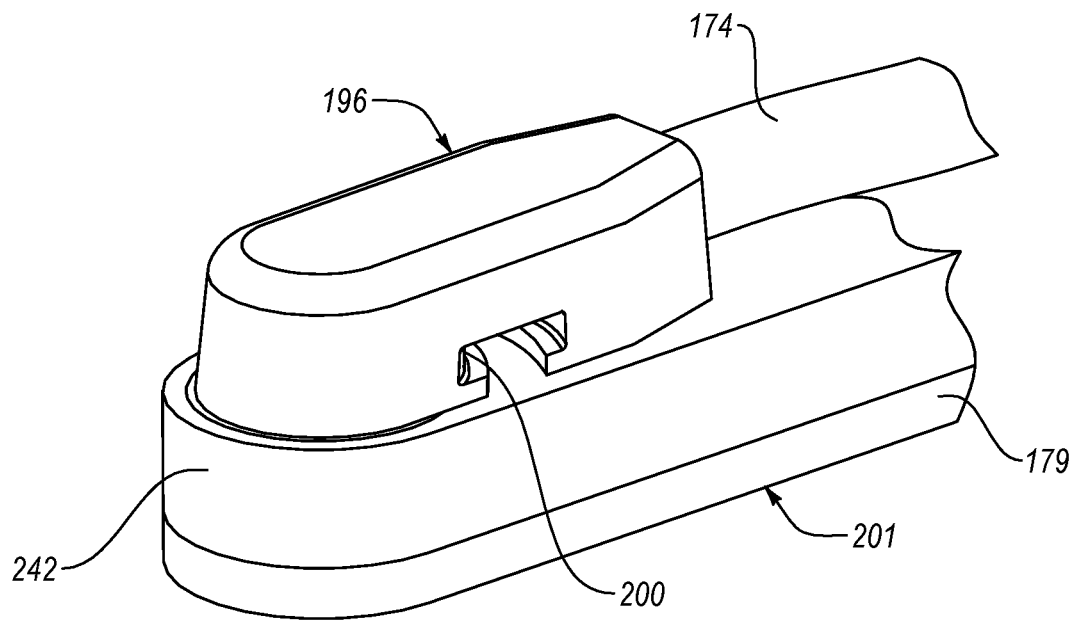
Figure 10:
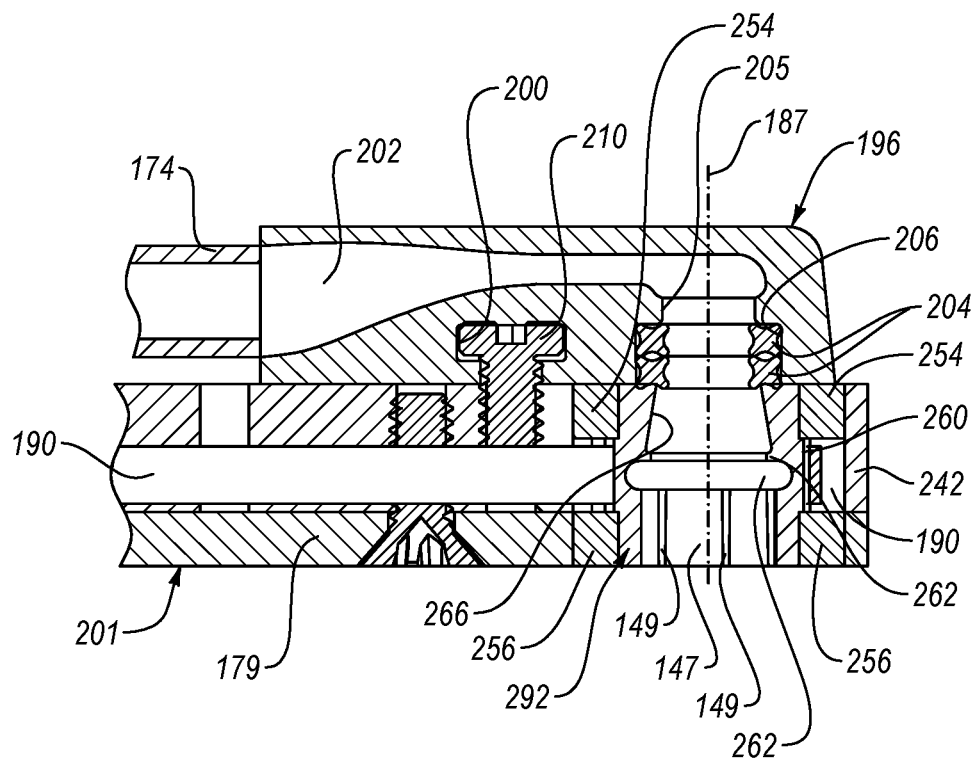
Figure 11:
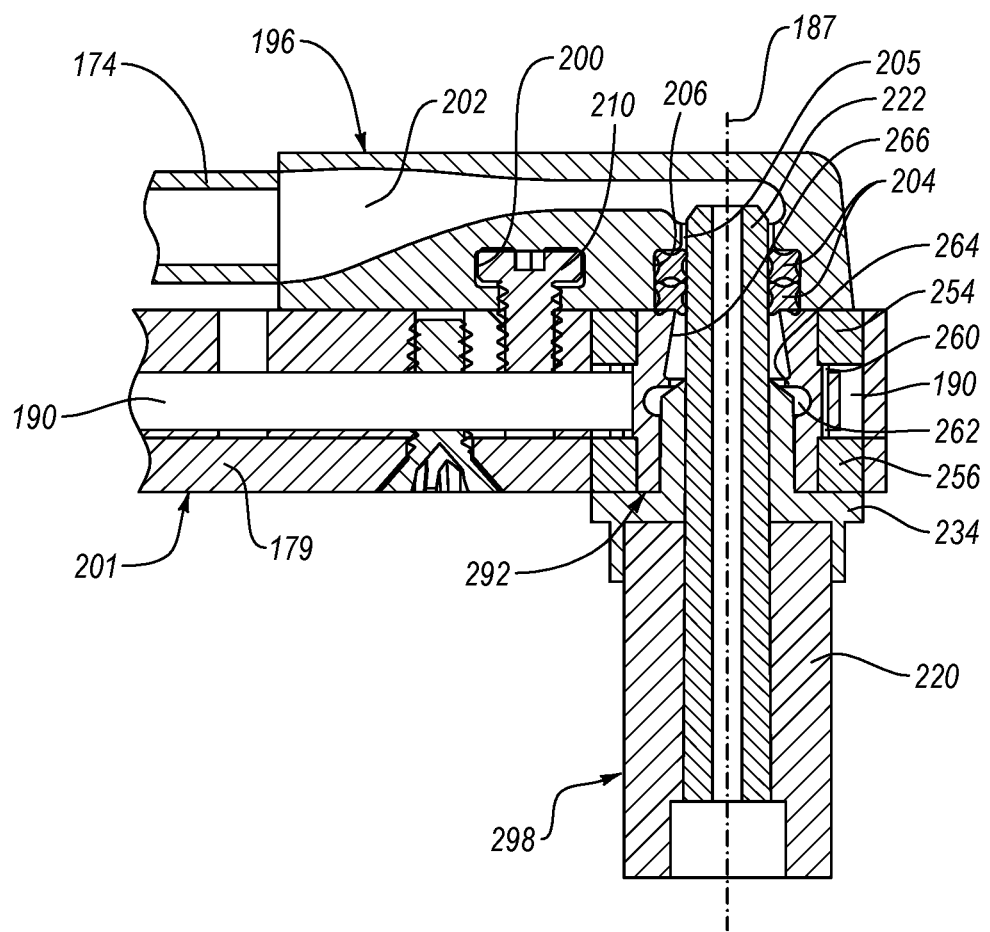
Figure 12:
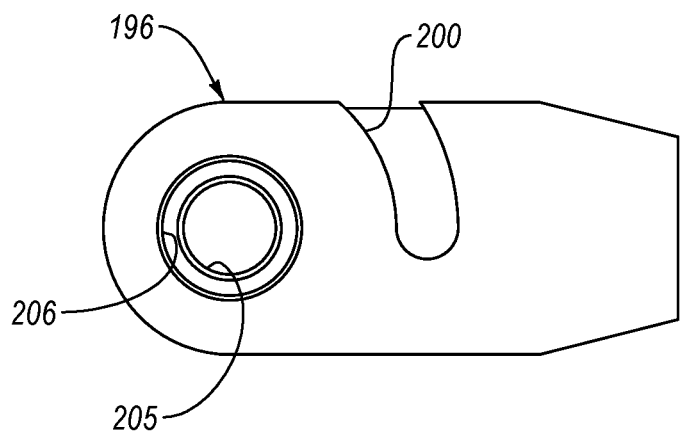
Figure 13B:
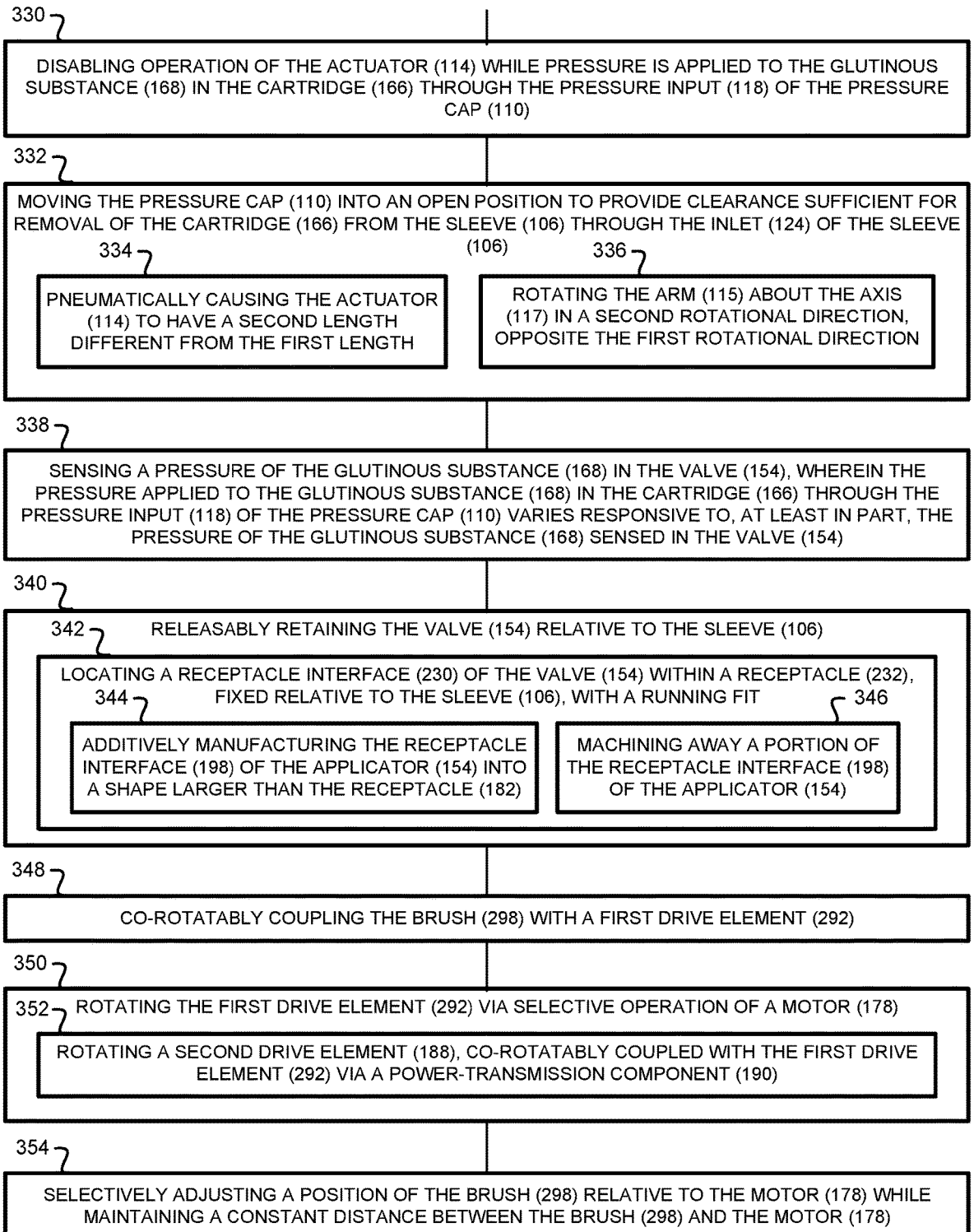
Figure 14:
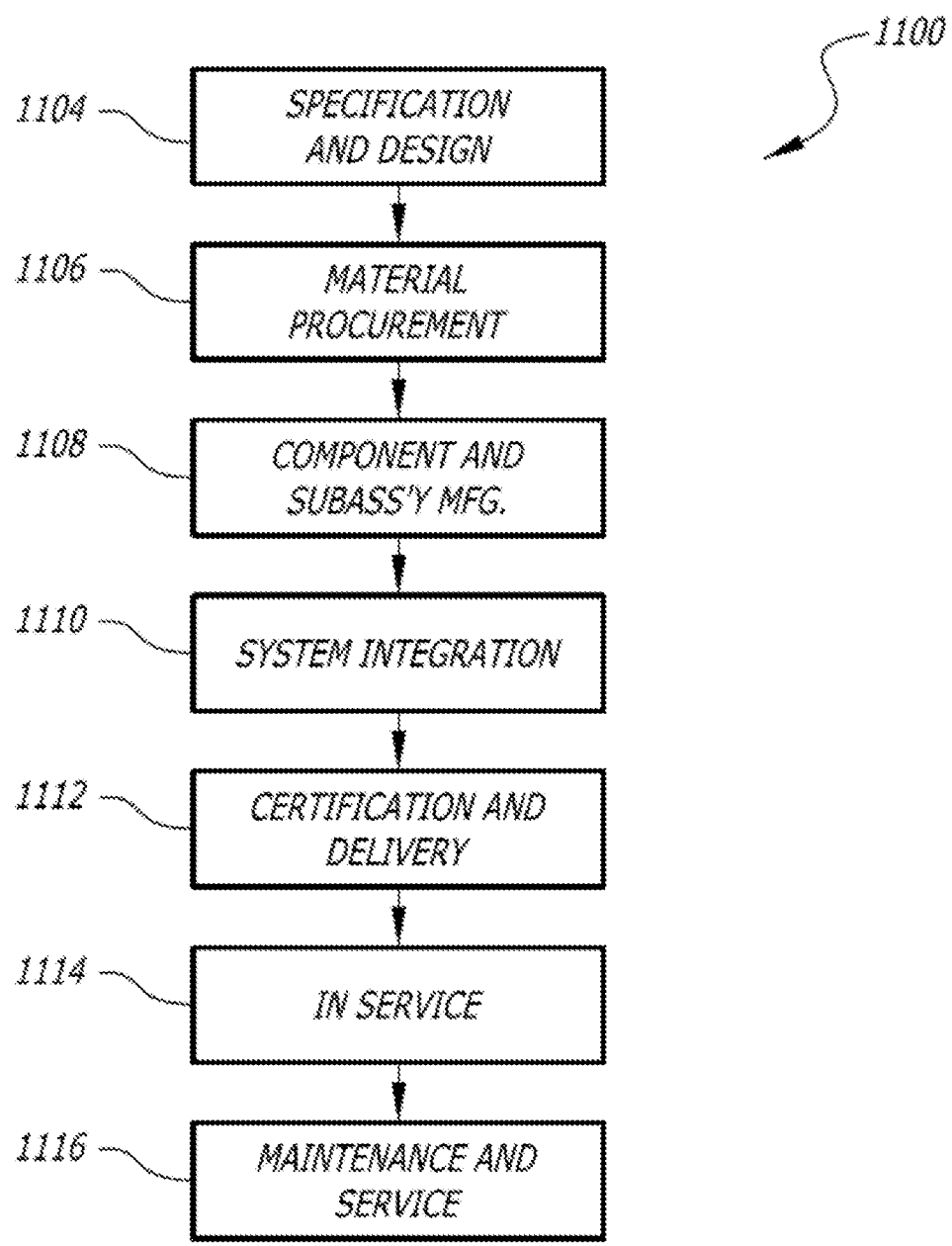

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a block diagram of a system for delivering a glutinous substance from a cartridge to a surface of a workpiece, wherein the system includes an apparatus for delivering the glutinous substance from the cartridge to a brush, according to one or more examples of the present disclosure;

FIG. 1B is a block diagram of a brush-arm assembly and a brush of the system of FIG. 1A, according to one or more examples of the present disclosure;

FIG. 2 is a schematic, perspective view of the apparatus of FIG. 1A, according to one or more examples of the present disclosure;

FIG. 3 is a schematic, side elevation view of the apparatus of FIG. 1A, according to one or more examples of the present disclosure;

FIG. 4 is a schematic, side elevation view of the apparatus of FIG. 1A, according to one or more examples of the present disclosure;

FIG. 5 is a schematic, bottom plan view of the apparatus of FIG. 1A, according to one or more examples of the present disclosure;

FIG. 6 is a schematic, perspective view of the apparatus of FIG. 1A, according to one or more examples of the present disclosure;

FIG. 7 is a schematic, cross-sectional side elevation view of the apparatus of FIG. 1A, according to one or more examples of the present disclosure;

FIG. 8 is a schematic, cross-sectional side elevation view of the brush-arm assembly of FIG. 1B, according to one or more examples of the present disclosure;

FIG. 9 is a schematic, perspective view of a detail of the brush-arm assembly of FIG. 1B, according to one or more examples of the present disclosure;

FIG. 10 is a schematic, cross-sectional side elevation view of the detail of the brush-arm assembly, shown in FIG. 9, according to one or more examples of the present disclosure;

FIG. 11 is a schematic, cross-sectional side elevation view of a detail of the brush-arm assembly of FIG. 1B and the brush of FIG. 1B, according to one or more examples of the present disclosure;

FIG. 12 is a schematic, bottom plan view of a component of the brush-arm assembly of FIG. 1B, according to one or more examples of the present disclosure;

FIGS. 13A, 13B, and 13C collectively are a block diagram of a method of utilizing the apparatus of FIG. 1A, according to one or more examples of the present disclosure;

FIG. 14 is a block diagram of aircraft production and service methodology; and

Figure 15:
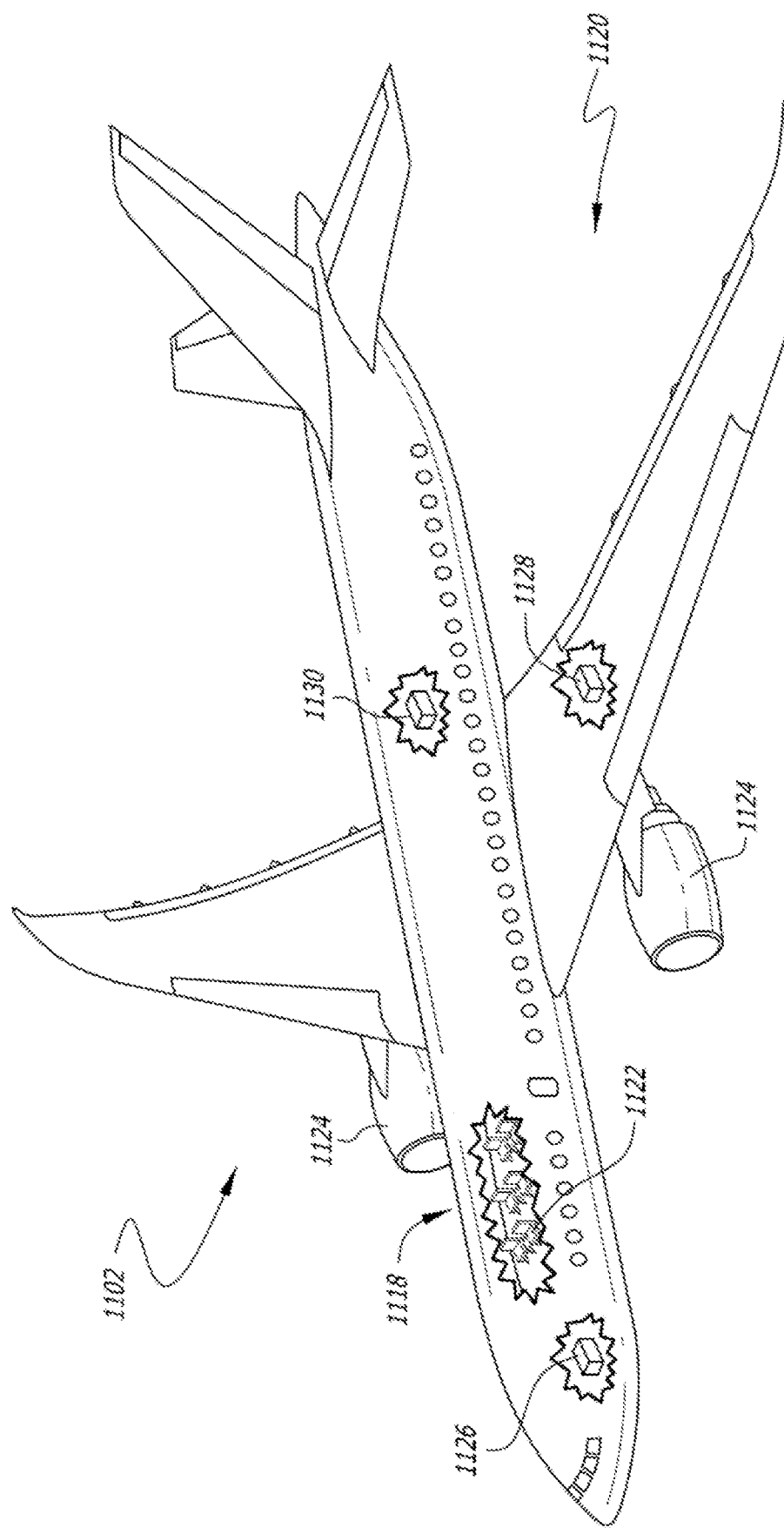

FIG. 15 is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 13A, 13B, 13C, and 14, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 13A, 13B, 13C, and 14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter according the present disclosure are provided below.

Referring generally to FIGS. 1A and 1B and particularly to, e.g., FIGS. 2-6, apparatus 102 for delivering glutinous substance 168 from cartridge 166 to brush 298 is disclosed. Apparatus 102 comprises sleeve 106, comprising central axis 121, inlet 124, and outlet 128 opposite inlet 124. Sleeve 106 is configured to receive cartridge 166 through inlet 124. Apparatus 102 also comprises pressure-cap assembly 104, coupled to sleeve 106. Pressure-cap assembly 104 comprises pressure cap 110, proximate inlet 124 of sleeve 106. With cartridge 166 received within sleeve 106, pressure cap 110 is movable between, inclusively, a closed position, in which pressure cap 110 is in sealed engagement with trailing end 169 of cartridge 166, and an open position, in which pressure cap 110 provides clearance sufficient for insertion of cartridge 166 inside sleeve 106 through inlet 124. Pressure cap 110 comprises pressure input 118, selectively operable to apply pressure to glutinous substance 168 in cartridge 166 when cartridge 166 is received within sleeve 106, pressure cap 110 is in the closed position, and leading end 167 of cartridge 166 is in sealed engagement with valve 154. Pressure-cap assembly 104 also comprises actuator 114, coupled to pressure cap 110 and to sleeve 106. Actuator 114 is selectively operable to move pressure cap 110 relative to sleeve 106 between, inclusively, the closed position and the open position. Additionally, apparatus 102 comprises valve interface 108, proximate outlet 128 of sleeve 106. Valve interface 108 is configured to be coupled with valve 154. Apparatus 102 further comprises brush-arm assembly 176, coupled to sleeve 106. Brush-arm assembly 176 is configured to retain brush 298 and is capable of rotating brush 298. Valve 154 is selectively operable, when the pressure is applied to glutinous substance 168 in cartridge 166, to enable glutinous substance 168 to flow from cartridge 166 to brush 298 at least when brush-arm assembly 176 rotates brush 298. The preceding subject matter of this paragraph characterizes example 1 of the present disclosure.

Apparatus 102 is configured to facilitate a reduction in the labor, time, and inaccuracies associated with the application of glutinous substances onto surfaces of workpieces. Cartridge 166 of apparatus 102 provides modular containment of glutinous substance 168. Sleeve 106 of apparatus 102 enables a secure coupling of cartridge 166 to apparatus 102. Pressure-cap assembly 104 allows both access to sleeve 106 for the insertion of cartridge 166 into sleeve 106 and the application of pressure to cartridge 166 for urging glutinous substance 168 out of sleeve 106. Actuator 114 facilitates automated actuation of pressure-cap assembly 104. Valve interface 108 enables secure attachment of valve 154 to apparatus 102 and quick release of valve 154 from apparatus 102. With cartridge 166 received within sleeve 106 and pressure cap 110 in a closed position, cartridge 166 is sealed with valve 154 to enable sealed flow of glutinous substance 168 from cartridge 166 to valve 154 via the application of pressure to glutinous substance 168 in cartridge 166. Brush-arm assembly 176 enables rotation of brush 298 and facilitates delivery of glutinous substance 168 to brush 298 while brush 298 is rotating.

Apparatus 102 can include pressure tubes 138 to facilitate the communication of pressure to and from various components of apparatus 102. For example, pressure tubes 138 may communicate pressure to pressure inputs 118. As an example, pressure tubes 138 may communicate pressure to and from actuator 114 to facilitate selective operation of actuator 114. Also, pressure tubes 138 may communicate pressure to pressure inputs 130 to control operation of valve 154, such as opening and closing of valve 154.

In some examples, various components of apparatus 102 are fixed to sleeve 106 via clamps 116, 132. For example, actuator 114 is fixed to sleeve 106 by clamp 116 and valve interface 108 is fixed to sleeve 106 by tube 194 secured about sleeve 106 by clamp 132. According to other examples, the various components of apparatus 102 are fixed to sleeve 106 using other fixation techniques, such as fastening, adhering, co-forming, and the like.

Actuator 114 can be any of various actuators known in the art, such as linear actuators and rotary actuators, powered in any of various ways, such as pneumatically, electromagnetically, electrically, hydraulically, and the like. Pressure inputs 118, 130 can be pneumatic fittings in some examples. As used herein, a central axis of an object is a longitudinal symmetry axis of the object.

Referring generally to FIGS. 1A and 1B and particularly to, e.g., FIGS. 2, 4, 6, and 7, pressure input 118 of pressure cap 110 is selectively pneumatically operable. The preceding subject matter of this paragraph characterizes example 2 of the present disclosure, wherein example 2 also includes the subject matter according to example 1, above.

Selective pneumatic operation of pressure input 118 of pressure cap 110 enables precise application of pneumatic pressure to glutinous substance 168 in cartridge 166 to precisely control the flow of glutinous substance 168 out of cartridge 166 and into valve 154. Moreover, selective pneumatic operation of pressure input 118 of pressure cap 110 facilitates the use of automated pneumatic controls to control the pneumatic operation of pressure input 118 of pressure cap 110.

Referring generally to FIGS. 1A AND 1B and particularly to, e.g., FIG. 7, pressure cap 110 further comprises gasket 111, configured to form a seal between pressure cap 110 and interior surface 113 of cartridge 166 when pressure cap 110 is in the closed position and valve 154 is retained by valve interface 108. The preceding subject matter of this paragraph characterizes example 3 of the present disclosure, wherein example 3 also includes the subject matter according to any one of examples 1 or 2, above.

Gasket 111, by forming seal between pressure cap 110 and interior surface 113 of cartridge 166, facilitates the containment of pressure from pressure input 118 of pressure cap 110 to within cartridge 166.

Gasket 111 can be an O-ring made from a pliable or compressible material, such as rubber, silicone, and plastic polymers.

Referring generally to FIGS. 1A and 1B and particularly to, e.g., FIG. 2, pressure-cap assembly 104 further comprises arm 115, pivotable about axis 117 that is fixed relative to sleeve 106 and is perpendicular to central axis 121 of sleeve 106. Pressure cap 110 is coupled with arm 115. The preceding subject matter of this paragraph characterizes example 4 of the present disclosure, wherein example 4 also includes the subject matter according to any one of examples 1-3, above.

Arm 115, being pivotable about axis 117 that is fixed relative to sleeve 106 and is perpendicular to central axis 121 of sleeve 106, enables pressure cap 110 to be moved between the closed position, to sealingly engage trailing end 169 of cartridge 166, and the open position, to provide clearance sufficient for insertion of cartridge 166 inside sleeve 106 through inlet 124 of sleeve 106 and ejection of cartridge 166 from sleeve 106. In other words, arm 115 allows pressure cap 110 to be pivoted into sealed engagement with cartridge 166 and pivoted away from cartridge 166 to allow cartridge 166 to be inserted into or removed from sleeve 106.

Referring generally to FIGS. 1A and 1B and particularly to, e.g., FIGS. 2-4 and 6, pressure-cap assembly 104 further comprises lock mechanism 112, mechanically coupling arm 115 with actuator 114. Lock mechanism 112 is configured to releasably lock pressure cap 110 in the closed position by releasably locking arm 115 relative to sleeve 106. The preceding subject matter of this paragraph characterizes example 5 of the present disclosure, wherein example 5 also includes the subject matter according to example 4, above.

Using lock mechanism 112 to releasably lock pressure cap 110 in the closed position by releasably locking arm 115 relative to sleeve 106 prevents disengagement between pressure cap 110 and cartridge 166 should actuator 114 fail. In other words, in the event actuator 114 fails to urge pressure cap 110 in closed position, such as due to loss of pressure to or malfunction of actuator 114, while pressure is applied to glutinous substance 168 in cartridge 166, lock mechanism 112 locks pressure cap 110 in the closed position to prevent pressure within cartridge 116 from inadvertently moving pressure cap 110 out of the closed position.

Referring generally to FIGS. 1A and 1B and particularly to, e.g., FIGS. 2-4 and 6, actuator 114 is selectively operable to move lock mechanism 112 between, inclusively, a locked position, in which arm 115 is releasably locked relative to sleeve 106 so pressure cap 110 is releasably locked in the closed position, and an unlocked position, in which arm 115 is arranged relative to sleeve 106 so that pressure cap 110 is in the open position. The preceding subject matter of this paragraph characterizes example 6 of the present disclosure, wherein example 6 also includes the subject matter according to example 5, above.

Actuator 114 is configured to enable lock mechanism 112 to unlock pressure cap 110 and allow pressure cap 110 to move out of the closed position by moving lock mechanism 112 relative to arm 115, via selective operation of actuator 114, while pressure cap 110 is sealingly engaged with cartridge 166. In other words, lock mechanism 112 in the locked position will lock pressure cap 110 in the closed position until actuator 114 moves lock mechanism 112 relative to pressure cap 110 to unlock lock mechanism 112 and move pressure cap 110 into the open position.

Referring generally to FIGS. 1A and 1B and particularly to, e.g., FIGS. 2-4 and 6, actuator 114 is pneumatically operable. When lock mechanism 112 is in the locked position, lock mechanism 112 remains in the locked position if actuator 114 loses pressure. The preceding subject matter of this paragraph characterizes example 7 of the present disclosure, wherein example 7 also includes the subject matter according to example 6, above.

In the event actuator 114 loses pressure, while pressure is applied to glutinous substance 168 in cartridge 166, lock mechanism 112 locks pressure cap 110 in the closed position to prevent pressure within cartridge 116 from inadvertently moving pressure cap 110 out of the closed position.

Referring generally to FIGS. 1A and 1B and particularly to, e.g., 2-4 and 6, lock mechanism 112 comprises an over-center linkage. The preceding subject matter of this paragraph characterizes example 8 of the present disclosure, wherein example 8 also includes the subject matter according to any one of examples 5-7, above.

The over-center linkage of lock mechanism 112 enables quick, easy, and effective locking and unlocking of the lock mechanism.

The over-center linkage can be a passive lock mechanism that is simply constructed, yet effective at preventing back-driving. For example, the over-center linkage includes first and second linkages each independently pivotable about the same first axis. The first linkage is pivotally fixed to arm 115 and pivots about a second axis. The second linkage is pivotally fixed relative to sleeve 106 and pivots about a third axis. As arm 115 rotates to move pressure cap 110 toward closed position, the first linkage rotates about the first axis in a first rotational direction and the second linkage rotates about the first axis in a second rotational direction opposite the first rotational direction until the first, second, and third axes are aligned, which positions the over-center linkage in an over-center position. Further rotation of arm 115 to move pressure cap 110 into the closed position results in the over-center linkage moving beyond the over-center position, which locks arm 115 and prevents arm 115 from rotating pressure cap 110 toward the open position. The over-center linkage is unlocked to allow arm 115 to rotate pressure cap 110 toward the open position by concurrently pivoting, via actuator 114, the first linkage about the first axis in the second rotational direction and pivoting the second linkage about the first axis in the first rotational direction until the over-center linkage moves into and beyond the over-center position.

Referring generally to FIGS. 1A and 1B and particularly to, e.g., FIG. 2, pressure cap 110 is pivotable relative to arm 115. Pressure-cap assembly 104 further comprises biasing element 122, configured to torsionally bias pressure cap 110 relative to arm 115. The preceding subject matter of this paragraph characterizes example 9 of the present disclosure, wherein example 9 also includes the subject matter according to any one of examples 4-8, above.

Because arm 115, to which pressure cap 110 is coupled, rotates to move pressure cap 110 into the closed positioned, in sealed engagement with trailing end 169 of cartridge 166, enabling pressure cap 110 to pivot relative to arm 115 allows pressure cap 110 to maintain coaxial alignment with trailing end 169 of cartridge 166 as arm 115 rotates. By torsionally biasing pressure cap 110, biasing element 122 ensures pressure cap 110 is coaxially aligned with trailing end 169 of cartridge 166 as pressure cap 110 initially engages trailing end 169 of cartridge 166. In this manner, pressure cap 110 can properly engage and seat within trailing end 169 of cartridge 166 without binding with or crookedly entering trailing end 169 of cartridge 166. As used herein, to "torsionally bias" means to continuously apply a moment, which may or may not have a constant magnitude, but is always applied in the same direction and has a magnitude greater than zero.

Referring generally to FIGS. 1A and 1B and particularly to, e.g., FIG. 2, biasing element 122 comprises a torsion spring. The preceding subject matter of this paragraph characterizes example 10 of the present disclosure, wherein example 10 also includes the subject matter according to example 9, above.

A torsion spring facilitates a passive and simple way to torsionally bias pressure cap 110 relative to arm 115.

The torsion spring can be coupled at one end to arm 115 and at another end to pressure cap 110. In some examples, the torsion spring includes a coiled or twisted torsion bar that biases one end of the torsion spring relative to the other end of the torsion spring.

Referring generally to FIGS. 1A and 1B and particularly to, e.g., FIG. 5, apparatus 102 further comprises control valve 181 that is pneumatically coupled to pressure input 118 of pressure cap 110 and to actuator 114. Control valve 181 is configured to disable operation of actuator 114 by preventing pressure from being communicated to actuator 114 to disable operation of actuator 114 when, with pressure cap 110 in the closed position, pressure is applied to glutinous substance 168 in cartridge 166 through pressure input 118. The preceding subject matter of this paragraph characterizes example 11 of the present disclosure, wherein examplell also includes the subject matter according to any one of examples 1-10, above.

Control valve 181 prevents actuator 114 from inadvertently opening pressure cap 110 while pressure is being applied to glutinous substance 168 in cartridge 166 through pressure input 118. Preventing pressure cap 110 from opening while pressure is being applied to glutinous substance 168 due to inadvertent actuation of actuator 114 ensures pressure within cartridge 166 is not inadvertently released.

In some examples, control valve 181 is a two-way, normally open, air-piloted valve manufactured by Clippard Instrument Laboratory, Inc. of Cincinnati, Ohio.

Referring generally to FIGS. 1A and 1B and particularly to, e.g., FIGS. 2 and 7, apparatus 102 further comprises pressure sensor 158, configured to be coupled to valve 154. The preceding subject matter of this paragraph characterizes example 12 of the present disclosure, wherein example 12 also includes the subject matter according to any one of examples 1-11, above.

Pressure sensor 158 enables detection of the pressure of glutinous substance 168 in valve 154. The pressure of glutinous substance 168 in valve 154 detected by pressure sensor 158 can be used to control the rate at which glutinous substance 168 flows from cartridge 166 to valve 154. Additionally, the pressure of glutinous substance 168 in valve 154 detected by pressure sensor 158 can be used to control valve 154 to regulate the rate at which glutinous substance 168 flows from valve 154 to brush 298. Further, pressure sensor 158 being configured to be coupled to valve 154 allows pressure sensor 158 to remain part of apparatus 102 while being decoupleable from valve 154 to remove valve 154 from apparatus 102 or being coupleable to valve 154 after valve 154 is coupled to apparatus 102.

Referring generally to FIGS. 1A and 1B and particularly to, e.g., FIGS. 2 and 4-6, apparatus 102 further comprises pressure-signal conditioner 144, electrically coupled to pressure sensor 158. The preceding subject matter of this paragraph characterizes example 13 of the present disclosure, wherein example 13 also includes the subject matter according to example 12, above.

Pressure-signal conditioner 144 enables communication of pressure-related information from pressure sensor 158 to controller 157 in a format useable by controller 157. Accordingly, pressure-signal conditioner 144 provides data format conversion functionality on-board apparatus 102, rather than at controller 157.

Referring generally to FIGS. 1A and 1B and particularly to, e.g., FIGS. 5 and 7, valve interface 108 comprises receptacle 182 that is cross-sectionally complementary to receptacle interface 198 of valve 154. Valve interface 108 further comprises retainer 184, rotatable relative to receptacle 182. The preceding subject matter of this paragraph characterizes example 14 of the present disclosure, wherein example 14 also includes the subject matter according to any one of examples 1-13, above.

Receptacle 182 of valve interface 108 being cross-sectionally complementary to receptacle interface 198 of valve 154, along with retainer 184, ensures valve 154 is securely coupled to valve interface 108 by providing a relatively tight fit between receptacle 182 of valve interface 108 and receptacle interface 198 of valve 154.

In some examples, the shapes of receptacle 182 of valve interface 108 and receptacle interface 198 of valve 154 are non-round (e.g., rectangular) such that, when receptacle interface 198 is received within receptacle 182, rotation of valve 154 relative to valve interface 108 is prevented. According to yet some examples, receptacle interface 198 of valve 154 is nestably engageable with receptacle 182 of valve interface 108.

Referring generally to FIG. 1 and particularly to, e.g., FIGS. 5 and 7, retainer 184 comprises aperture 186. Aperture 186 is configured so that receptacle interface 198 of valve 154 is retained inside valve interface 108 when retainer 184 is in at least one retaining orientation relative to receptacle 182. Aperture 186 is also configured so that receptacle interface 198 of valve 154 is removable from valve interface 108 when retainer 184 is in at least one releasing orientation relative to receptacle 182. The preceding subject matter of this paragraph characterizes example 15 of the present disclosure, wherein example 15 also includes the subject matter according to example 14, above.

Use of retainer 184 allows for quick and easy secure coupling of valve 154 to valve interface 108 and decoupling of valve 154 from valve interface 108. Retainer 184 can be reoriented between the at least one retaining orientation and the at least one releasing orientation to allow for secure coupling of valve 154 to valve interface 108 and decoupling of valve 154 from valve interface 108. In one example, retainer 184 is a disk-like element that is rotatable to orient retainer 184 between the at least one retainer orientation and the at least one releasing orientation.

Referring generally to FIGS. 1A and 1B and particularly to, e.g., FIGS. 5 and 7, aperture 186 of retainer 184 has a shape identical to that of a cross-section of receptacle 182. The cross-section of receptacle 182 is perpendicular to central axis 121 of sleeve 106. The preceding subject matter of this paragraph characterizes example 16 of the present disclosure, wherein example 16 also includes the subject matter according to example 15, above.

Aperture 186 of retainer 184 having an identical shape as the cross-section of receptacle 182, enables receptacle interface 198 of valve 154 to be inserted through aperture 186 of retainer 184 into receptacle 182, or removed through aperture 186 of retainer 184 from receptacle 182, when retainer 184 is in the at least one releasing orientation, and enables receptacle interface 198 of valve 154 to be retained within receptacle 182 when retainer 184 is oriented into the at least one retaining orientation. More specifically, because aperture 186 of retainer 184 has a shape identical to that of a cross-section of receptacle 182, when in the at least one releasing orientation, no portion of retainer 184 covers receptacle 182 to allow insertion and removal of receptacle interface 198 into and out of receptacle 182, and when in the at least one retaining orientation, some portion of retainer 184 covers receptacle 182 to retain receptacle interface 198 within receptacle 182.

Referring generally to FIGS. 1A and 1B and particularly to, e.g., FIGS. 5 and 7, retainer 184 comprises at least one grip element 189 extending from retainer 184. The preceding subject matter of this paragraph characterizes example 17 of the present disclosure, wherein example 17 also includes the subject matter according to any one of examples 14-16, above.

At least one grip element 189 facilitates the manual gripping of retainer 184 for rotating retainer 184. In other words, at least one grip element 189 can be easily gripped (e.g., pinched or received) by a user to manually rotate retainer 184.

In some examples, at least one grip element 189 can be any of various protrusions, such as posts, knobs, bars, spikes, projections, and the like, extending from retainer 184. According to yet other examples, at least one grip element 189 can be any of various depressions in retainer 184 with which a user may engage. At least one grip element 189 may include surface features or materials configured to enhance a user's grip of at least one grip element 189.

Referring generally to FIGS. 1A and 1B and particularly to, e.g., FIGS. 5 and 7, valve interface 108 comprises plurality of detents 192, configured to provide at least one retaining orientation of retainer 184 relative to receptacle 182 and the at least one releasing orientation of retainer 184 relative to receptacle 182. Each of plurality of detents 192 is configured to selectively releasably fix retainer 184 relative to receptacle 182 in one of the at least one retaining orientation or the at least one releasing orientation relative to receptacle 182. The preceding subject matter of this paragraph characterizes example 18 of the present disclosure, wherein example 18 also includes the subject matter according to any one of examples 14-17, above.

Plurality of detents 192 enable retainer 184 to be fixed in one orientation, selectively released from that orientation, and fixed in another orientation. Accordingly, plurality of detents 192 facilitate selectively orienting retainer 184 between multiple orientations and releasably fixing retainer 184 in a respective one of the multiple orientations. In this manner, a user can quickly and easily switch the orientation of retainer 184 between multiple orientations while ensuring retainer 184 will be releasably fixed in a selected orientation.

In some examples, each of plurality of detents 192 includes a projection (e.g., ball or pin) biased, via a biasing element (e.g., spring), into engagement with one of multiple apertures formed in retainer 184. The position of each aperture 190 on retainer 184 ensures that engagement of the projection of one of plurality of detents 192 with one of aperture orients retainer 184 in one of the at least one releasing orientation or one of the at least one retaining orientation. For example, the position of apertures on retainer 184 ensures that engagement of the projection of one of plurality of detents 192 with one aperture orients retainer 184 in one of the at least one releasing orientation or one of the at least one retaining orientation, and engagement of the projection of the one of plurality of detents 192 with an adjacent aperture orients retainer 184 in the other of the at least one releasing orientation or one of the at least one retaining orientation. Plurality of detents 192 release retainer 184 when bias of biasing element is overcome via application of rotational pressure to retainer 184 by a user.

Referring generally to FIGS. 1A and 1B and particularly to, e.g., FIGS. 2 and 5, the at least one retaining orientation of retainer 184 relative to receptacle 182 is at least four retaining orientations and the at least one releasing orientation of retainer 184 relative to receptacle 182 is at least four releasing orientations. The preceding subject matter of this paragraph characterizes example 19 of the present disclosure, wherein example 19 also includes the subject matter according to example 18, above.

The at least four retaining orientations of retainer 184 relative to receptacle 182 and the at least four releasing orientations of retainer 184 relative to receptacle 182 enable flexibility when rotating retainer 184 to switch between a releasing orientation and a retaining orientation.

Referring generally to FIGS. 1A and 1B and particularly to, e.g., FIGS. 2 and 5, the at least one retaining orientation of retainer 184 relative to receptacle 182 is at least six retaining orientations and the at least one releasing orientation of retainer 184 relative to receptacle 182 is at least six releasing orientations. The preceding subject matter of this paragraph characterizes example 20 of the present disclosure, wherein example 20 also includes the subject matter according to example 18, above.

The at least six retaining orientations of retainer 184 relative to receptacle 182 and the at least six releasing orientations of retainer 184 relative to receptacle 182 enable even more flexibility when rotating retainer 184 to switch between a releasing orientation and a retaining orientation.

Referring generally to FIGS. 1A and 1B and particularly to, e.g., FIGS. 2-6, apparatus 102 further comprises robot interface 136, coupled with sleeve 106 and configured to be releasably coupled to robot 152. The preceding subject matter of this paragraph characterizes example 21 of the present disclosure, wherein example 21 also includes the subject matter according to any one of the examples 1-20, above.

Robot interface 136 promotes quick coupling of apparatus 102 with robot 152 and quick releasing of apparatus 102 from robot 152. Additionally, robot interface 136 facilitates quick coupling of communication lines between apparatus 102 and robot 152. For example, robot interface 136 may enable automated coupling of apparatus 102 with robot 152 and automated releasing of apparatus 102 from robot 152.

In some examples, robot interface 136 can be a tool-side portion of a pneumatic quick-change mechanism and robot 152 can include tool interface 156 of the pneumatic quick-change mechanism.

Referring generally to FIGS. 1A and 1B and particularly to, e.g., FIGS. 2-6, apparatus 102 further comprises brackets 148, coupled with sleeve 106. Brackets 148 are configured to engage tool stand 197. The preceding subject matter of this paragraph characterizes example 22 of the present disclosure, wherein example 22 also includes the subject matter according to any one of examples 1-21, above.

Brackets 148 facilitate engagement with tool stand 197 for storing apparatus 102 when not in use.

According to some examples, brackets include apertures that receive respective engagement features of tool stand 197.

Referring generally to FIGS. 1A and 1B and particularly to, e.g. FIGS. 5 and 8, brush-arm assembly 176 comprises first drive element 292 and motor 178, operatively coupled with first drive element 292 and selectively operable to rotate first drive element 292. Brush 298 is co-rotatably coupleable with first drive element 292. The preceding subject matter of this paragraph characterizes example 23 of the present disclosure, wherein example 23 also includes the subject matter according to any of the examples 1-22, above.

Motor 178 being operatively coupled with first drive element 292 and brush 298 being co-rotatably coupleable with first drive element 292 enables motor 178 to selectively rotate brush 298. Generally, in certain examples, motor 178 comprises an output shaft that is rotatable by motor 178 to produce a rotary force or torque when motor 178 is operated. In some examples, motor 178 can be any of various rotational motors known in the art, such as electric rotational motors, hydraulic rotational motors, pneumatic rotational motors, electromagnetic rotational motors, and the like.

Referring generally to FIGS. 1A and 1B and particularly to, e.g., FIGS. 10 and 11, first drive element 292 comprises brush receptacle 147 configured to releasably retain brush 298. The preceding subject matter of this paragraph characterizes example 24 of the present disclosure, wherein example 24 also includes the subject matter according to example 23, above.

Brush receptacle 147 of first drive element 292 allows brush 298 to be quickly and easily retained by first drive element 292 and removed from first drive element 292.

Referring generally to FIGS. 1A and 1B and particularly to, e.g., FIGS. 10 and 11, brush receptacle 147 is configured to form an interference fit with engagement portion 234 of brush 298. The preceding subject matter of this paragraph characterizes example 25 of the present disclosure, wherein example 25 also includes the subject matter according to example 24, above.

Interference fit between brush receptacle 147 and engagement portion 234 of brush 298 promotes a secure retention of brush 298 by brush receptacle 147 and facilitates co-rotation of brush 298 and first drive element 292. Additionally, interference fit between brush receptacle 147 and engagement portion 234 of brush 298 enables brush receptacle 147 to releasably retain brush 298 simply by inserting engagement portion 234 of brush 298 into brush receptacle 147 without the need for additional fasteners or retention means.

Referring generally to FIGS. 1A and 1B and particularly to, e.g., FIG. 10, brush receptacle 147 comprises at least one internal spline 149. The preceding subject matter of this paragraph characterizes example 26 of the present disclosure, wherein example 26 also includes the subject matter according to any one of examples 24 or 25, above.

At least one internal spline 149 enables the interference fit between brush receptacle 147 and engagement portion 234 of brush 298. In one example, at least one internal spline 149 at least partially penetrates into engagement portion 234 of brush 298 to promote the interference fit.

Referring generally to FIGS. 1A and 1B and particularly to, e.g., FIGS. 10 and 11, first drive element 292 further comprises internally tapered portion 266, co-axially adjacent brush receptacle 147 of first drive element 292. The preceding subject matter of this paragraph characterizes example 27 of the present disclosure, wherein example 27 also includes the subject matter according to any one of examples 24-26, above.

Internally tapered portion 266 of first drive element 292 facilitates co-axial alignment between first drive element 292 and brush 298 as brush 298 is inserted into first drive element 292 to promote proper engagement of brush 298 with gaskets 204 of cap 196. In some examples, internally tapered portion 266 may also help to retain gaskets 204 within gasket recess 206 of cap 196 when cap 196 is coupled to drive-element housing 179.

Referring generally to FIGS. 1A and 1B and particularly to, e.g., FIGS. 10 and 11, first drive element 292 further comprises annular internal shoulder 264, co-axially interposed between brush receptacle 147 of first drive element 292 and internally tapered portion 266 of first drive element 292. The preceding subject matter of this paragraph characterizes example 28 of the present disclosure, wherein example 28 also includes the subject matter according to example 27 above.

Annular internal shoulder 264 of first drive element 292 acts as a stop to properly position engagement portion 234 of brush 298 relative to first drive element 292 and cap 196, as well as to prevent over-insertion of engagement portion 234 of brush 298 into first drive element 292 and cap 196. In some examples, annular internal shoulder 264 of first drive element 292 comprises a sharp edge or corner that is configured to contact a flat surface of engagement portion 234 of brush 298 in a surface-to-line engagement (as opposed to a surface-to-surface engagement) to reduce optical contact bonding between annular internal shoulder 264 of first drive element 292 and engagement portion 234 of brush 298.

Referring generally to FIGS. 1A and 1B and particularly to, e.g., FIGS. 10 and 11, first drive element 292 further comprises annular internal-clearance pocket 262, co-axially interposed between annular internal shoulder 264 of first drive element 292 and brush receptacle 147 of first drive element 292. A maximum diameter of annular internal-clearance pocket 262 is larger than a minimum diameter of annular internal shoulder 264 and larger than a maximum diameter of brush receptacle 147. The preceding subject matter of this paragraph characterizes example 29 of the present disclosure, wherein example 29 also includes the subject matter according to example 28, above.

Annular internal-clearance pocket 262 is configured to reduce surface-to-surface engagement between annular internal shoulder 264 of first drive element 292 and engagement portion 234 of brush 298 and to ensure a surface-to-line engagement between annular internal shoulder 264 of first drive element 292 and engagement portion 234 of brush 298.

Referring generally to FIGS. 1A and 1B and particularly to, e.g., FIGS. 8, 10, and 11, brush-arm assembly 176 is capable of rotating brush 298 about first rotation axis 187. First rotation axis 187 is oriented along second rotation axis 289 of motor 178. The preceding subject matter of this paragraph characterizes example 30 of the present disclosure, wherein example 30 also includes the subject matter according to any one of examples 23-29, above.

Orienting first rotation axis 187 along second rotation axis 289 of motor 178 promotes operative coupling between motor 178 and first drive element 292. For example, orienting first rotation axis 187 along second rotation axis 289 of motor 178 can reduce the complexity with, and improve reliability of, operatively coupling motor 178 and first drive element 292.

Referring generally to FIGS. 1A and 1B and particularly to, e.g., FIGS. 8, 10, and 11, first rotation axis 187 is parallel to second rotation axis 289 of motor 178. The preceding subject matter of this paragraph characterizes example 31 of the present disclosure, wherein example 31 also includes the subject matter according to example 30, above.

Configuring first rotation axis 187 parallel to second rotation axis 289 of motor 178 promotes operative coupling between motor 178 and first drive element 292. For example, configuring first rotation axis 187 to be parallel to second rotation axis 289 of motor 178 can reduce the complexity with, and improve reliability of, operatively coupling motor 178 and first drive element 292.

Referring generally to FIGS. 1A and 1B and particularly to, e.g., FIG. 8, brush-arm assembly 176 further comprises second drive element 188, operatively coupled with motor 178. Motor 178 is selectively operable to rotate second drive element 188. Brush-arm assembly 176 also comprises power-transmission component 190, co-rotatably coupling first drive element 292 with second drive element 188. The preceding subject matter of this paragraph characterizes example 32 of the present disclosure, wherein example 32 also includes the subject matter according to any one of examples 23-31, above.

Second drive element 188 and power-transmission component 190 facilitate the transmission of power from motor 178 to first drive element 292.

Referring generally to FIGS. 1A and 1B and particularly to, e.g., FIG. 8, power-transmission component 190 comprises a belt or a chain. The preceding subject matter of this paragraph characterizes example 33 of the present disclosure, wherein example 33 also includes the subject matter according to example 32, above.

A belt or a chain provides an efficient and reliable mechanism to transmit power from motor 178 to first drive element 192, such as when first drive element 192 is not co-axial with second rotation axis 289 of motor 178.

Referring generally to FIGS. 1A and 1B and particularly to, e.g., FIGS. 10 and 11, first drive element 292 comprises external-socket portion 260, co-rotatably engaged with power-transmission component 190. The preceding subject matter of this paragraph characterizes example 34 of the present disclosure, wherein example 34 also includes the subject matter according to any one of examples 32 or 33, above.

Co-rotatable engagement between external-socket portion 260 and power-transmission component 190 promotes the transmission of power from power-transmission component 190 to first drive element 192. In some examples, power-transmission component 190 may comprise first engagement features, such as teeth, apertures, grooves, and the like, configured to meshingly engage corresponding second engagement features of external-socket portion 260.

Referring generally to FIGS. 1A and 1B and particularly to, e.g., FIGS. 6 and 8, brush-arm assembly 176 further comprises shaft 284, co-rotatably connecting second drive element 188 with motor 178. The preceding subject matter of this paragraph characterizes example 35 of the present disclosure, wherein example 35 also includes the subject matter according to any one of examples 32-34, above.

Shaft 284 facilitates the transmission of power from motor 178 to second drive element 188.

Referring generally to FIGS. 1A and 1B and particularly to, e.g., FIGS. 2-4, 6 and 8, brush-arm assembly 176 further comprises coupling 183, co-rotatably connecting shaft 284 with motor 178. The preceding subject matter of this paragraph characterizes example 36 of the present disclosure, wherein example 36 also includes the subject matter according to example 35, above.

Coupling 183 facilitates the transmission of power from motor 178 to shaft 284. In some examples, coupling 183 is a rotary union that is co-rotatably coupled to an output shaft of motor 178 at one end of coupling 183, and co-rotatably coupled to shaft 284 at an opposite end of coupling 183.

Referring generally to FIGS. 1A and 1B and particularly to, e.g., FIGS. 2-6 and 9-11, brush-arm assembly 176 further comprises shaft housing 177, at least partially enclosing coupling 183 and shaft 284. Brush-arm assembly 176 also comprises drive-element housing 179, at least partially enclosing first drive element 292, second drive element 188, and power-transmission component 190. The preceding subject matter of this paragraph characterizes example 37 of the present disclosure, wherein example 37 also includes the subject matter according to example 36, above.

Shaft housing 177 facilitates the protection of coupling 183 and shaft 284 from impacts and contaminants. Similarly, drive-element housing 179 facilitates the protection of first drive element 292, second drive element 188, and power-transmission component 190 from impacts and contaminants. Also, drive-element housing 179 enables secure retention of drive element 292, second drive element 188, and power-transmission component 190. In some examples, drive-element housing 179 comprises bearings 250, 252 that facilitate low-friction rotation of second drive element 188 and comprises bearings 254, 256 that facilitate low-friction rotation of first drive element 292. Bearings 250, 252, 254, 256 can be any of various types of bearings, such as radial ball bearings.

Referring generally to FIGS. 1A and 1B and particularly to, e.g., FIGS. 2-6 and 8, drive-element housing 179 is coupled with shaft housing 177. The preceding subject matter of this paragraph characterizes example 38 of the present disclosure, wherein example 38 also includes the subject matter according to example 37, above.

Coupling drive-element housing 179 with shaft housing 177 facilitates continuous protection of coupling 183, shaft 284, first drive element 292, second drive element 188, and power-transmission component 190. Additionally, coupling drive-element housing 179 with shaft housing 177 promotes stability and strength of brush-arm assembly 176.

Referring generally to FIGS. 1A and 1B and particularly to, e.g., FIGS. 2-6 and 8, angular orientation of drive-element housing 179 relative to shaft housing 177 is selectively adjustable. The preceding subject matter of this paragraph characterizes example 39 of the present disclosure, wherein example 39 also includes the subject matter according to example 38, above.

Selective adjustability of the angular orientation of drive-element housing 179 relative to shaft housing 177, as indicated by directional arrows in FIGS. 5 and 6, enables adjustment of the position of brush 298 relative to rotational axis 289, sleeve 106, and robot interface 136. In some examples, selective adjustability of the angular orientation of drive-element housing 179 relative to shaft housing 177 allows the position of brush 298 to be adjusted to accommodate workpieces of different sizes and shapes. According to certain examples, selectively adjustability of the angular orientation of drive-element housing 179 relative to shaft housing 177 is facilitated by adjustment of one or more set screws engageable with shaft housing 177 and drive-element housing 179, tightenable to prevent rotation of shaft housing 177 relative to drive-element housing 179, and loosenable to allow rotation of shaft housing 177 relative to drive-element housing 179.

Referring generally to FIGS. 1A and 1B and particularly to, e.g., FIGS. 2-6 and 8, the angular orientation of drive-element housing 179 relative to shaft housing 177 is selectively infinitely adjustable. The preceding subject matter of this paragraph characterizes example 40 of the present disclosure, wherein example 40 also includes the subject matter according to example 39, above.

Selective infinite adjustability of the angular orientation of drive-element housing 179 relative to shaft housing 177, as indicated by directional arrows in FIGS. 5 and 6, enables brush 298 to be positioned in any of an infinite number of positions relative to rotational axis 289, sleeve 106, and robot interface 136.

Referring generally to FIGS. 1A and 1B and particularly to, e.g., FIGS. 2-4 and 6, shaft housing 177 comprises window 175 through which coupling 183 is accessible. The preceding subject matter of this paragraph characterizes example 41 of the present disclosure, wherein example 41 also includes the subject matter according to any one of examples 37-40, above.

Window 175 enables visual confirmation that shaft 284 is co-rotatably coupled with motor 178. Additionally, window 175 provides access to coupling 183 through shaft housing 177 to facilitate serviceability of coupling 183 without the need to remove shaft housing 177 from apparatus 102. Furthermore, in some examples, brush portion 201 of brush-arm assembly 176 is selectively detachable from motor portion 180 of brush-arm assembly 176 to promote interchangeability of different brush-arm assemblies 176 with motor portion 180. Accordingly, window 175 provides access to coupling 183 through shaft housing 177 to facilitate decoupling of shaft 284 from coupling 183, which enables selective detachment of brush portion 201 of brush-arm assembly 176 from motor portion 180, or attachment of brush portion 201 of brush-arm assembly 176 to motor portion 180, without the need to remove motor portion 180 from apparatus 102.

Referring generally to FIGS. 1A and 1B and particularly to, e.g., FIGS. 2-6 and 8, drive-element housing 179 extends transversely from shaft housing 177. The preceding subject matter of this paragraph characterizes example 42 of the present disclosure, wherein example 42 also includes the subject matter according to any one of examples 37-41, above.

Drive-element housing 179 extending transversely from shaft housing 177 enables brush 198 to be positioned away from, or offset to, second rotation axis 187. Further, in some examples, drive-element housing 179 extending transversely from shaft housing 177 positions brush 198 away from other features of apparatus 102 to reduce obstruction between apparatus 102 and workpiece 170 while using apparatus 102 to deliver glutinous substance 168 from brush 198 to surface 172 of workpiece 170.

Referring generally to FIGS. 1A and 1B and particularly to, e.g., FIGS. 4, 5, 8, and 10, drive-element housing 179 comprises proximal end 240 and distal end 242. Proximal end 240 of drive-element housing 179 is coupled to shaft housing 177. First drive element 292 is at least partially enclosed within drive-element housing 179 at distal end portion 242 of drive-element housing 179. The preceding subject matter of this paragraph characterizes example 43 of the present disclosure, wherein example 43 also includes the subject matter according to example 42, above.

At least partially enclosing first drive element 292 within drive-element housing 179 at distal end portion 242 of drive-element housing 179 enables brush 198 to be positioned away from, or offset to, second rotation axis 187. Further, in some examples, at least partially enclosing first drive element 292 within drive-element housing 179 at distal end portion 242 of drive-element housing 179 facilitates the positioning of brush 198 away from other features of apparatus 102 to reduce obstruction between apparatus 102 and workpiece 170 while using apparatus 102 to deliver glutinous substance 168 from brush 198 to surface 172 of workpiece 170.

Referring generally to FIGS. 1A and 1B and particularly to, e.g., FIGS. 2-11, apparatus 102 further comprises substance-delivery tube 174, communicatively coupling valve 154 with brush 298. The preceding subject matter of this paragraph characterizes example 44 of the present disclosure, wherein example 44 also includes the subject matter according to any one of examples 37-43, above.

Substance-delivery tube 174 enables the delivery of glutinous substance 168 from valve 154 to brush 298. Additionally, substance-delivery tube 174 provides for the delivery of glutinous substance 168 from valve 154 to brush 298 along a path external to shaft housing 177 and drive-element housing 179 to enable the simplification and efficiency of transmitting power from motor 178 to first drive element 292.

Referring generally to FIGS. 1A and 1B and particularly to, e.g., FIGS. 2-11, valve 154 is selectively operable to allow glutinous substance 168 to flow from valve 154 to brush 298 through substance-delivery tube 174 when brush 298 is releasably retained by brush-arm assembly 176 and when brush-arm assembly 176 rotates brush 298. The preceding subject matter of this paragraph characterizes example 45 of the present disclosure, wherein example 45 also includes the subject matter according to example 44, above.

Substance-delivery tube 174 enables selective delivery of glutinous substance 168 from valve 154 to brush 298 when brush 298 is rotating.

Referring generally to FIGS. 1A and 1B and particularly to, e.g., FIGS. 2-4, 6, and 8-12, apparatus 102 further comprises cap 196, configured to be releasably coupled to brush-arm assembly 176. Cap 196 is configured to direct glutinous substance 168 from substance-delivery tube 174 to brush 298 when brush 298 is releasably retained by brush-arm assembly 176 and when brush-arm assembly 176 rotates brush 298. The preceding subject matter of this paragraph characterizes example 46 of the present disclosure, wherein example 46 also includes the subject matter according to any one of examples 44 or 45, above.

Cap 196 enables glutinous substance 168 to flow from substance-delivery tube 174 to brush 298 while brush 298 is rotating. Moreover, in some examples, cap 196 promotes a leak-free delivery of glutinous substance 168 from substance-delivery tube 174 to brush 298 while brush 298 is rotating.

Referring generally to FIGS. 1A and 1B and particularly to, e.g., FIGS. 2-4, 6, and 8-12, cap 196 comprises channel 202, extending through cap 196. Channel 202 is circumferentially closed. Glutinous substance 168 moves from substance-delivery tube 174 through channel 202 of cap 196 to brush 298 when brush 298 is releasably retained by brush-arm assembly 176 and when brush-arm assembly 176 rotates brush 298. The preceding subject matter of this paragraph characterizes example 47 of the present disclosure, wherein example 47 also includes the subject matter according to example 46, above.

Channel 202 of cap 196, being circumferentially closed, enables containment of glutinous substance 168 as glutinous substance 168 moves from substance-delivery tube 174 to brush 298. Moreover, in some examples, a cross-sectional area of channel 202 of cap 196 decreases in a direction from substance-delivery tube 174 to brush 298.

Referring generally to FIGS. 1A and 1B and particularly to, e.g., FIGS. 10 and 11, cap 196 further comprises gasket 204, configured to form a seal with hollow shaft 222 of brush 176. Hollow shaft 222 of brush 176 is rotatable relative to gasket 204. The preceding subject matter of this paragraph characterizes example 48 of the present disclosure, wherein example 48 also includes the subject matter according to example 47, above.

Gasket 204 enables containment of glutinous substance 168 within cap 196 while allowing for rotation of brush 176 relative to cap 196. In some examples, gasket 204 is configured to form a first seal with hollow shaft 222, while hollow shaft 222 rotates, and form a second seal with cap 196. In some examples, cap 196 comprises multiple gaskets 204 to enhance the containment of glutinous substance 168 within cap 196 while allowing for rotation of brush 176 relative to cap 196.

Gasket 204 can be a rotary seal, such as an O-ring, made from a pliable or compressible material, such as rubber, silicone, and plastic polymers.

Referring generally to FIGS. 1A and 1B and particularly to, e.g., FIGS. 10-12, cap 196 further comprises first receptacle 205, communicatively coupled with channel 202 and configured to receive hollow shaft 222 of brush 298. Gasket 204 is received within first receptacle 205. The preceding subject matter of this paragraph characterizes example 49 of the present disclosure, wherein example 49 also includes the subject matter according to example 48, above.

First receptacle 205 facilitates physical and fluid coupling between channel 202 of cap 196 and hollow shaft 222 of brush 298. Gasket 204 helps to ensure glutinous substance 168 from channel 202 does not flow entirely between first receptacle 205 of cap 196 and hollow shaft 222.

In some examples, first receptacle 205 of cap 196 includes gasket receiving portion 206 that mateably receives gasket 104 within first receptacle 205.

Referring generally to FIGS. 1A and 1B and particularly to, e.g., FIGS. 9-12, cap 196 further comprises retention slot 200. Brush-arm assembly 176 further comprises retention element 210, extending from drive-element housing 179 and configured to engage retention slot 200 when cap 196 is in contact with drive-element housing 179 and receptacle 205 is concentrically positioned relative to first drive element 292. The preceding subject matter of this paragraph characterizes example 50 of the present disclosure, wherein example 50 also includes the subject matter according to example 49, above.

Retention slot 200 of cap 196 and retention element 210 of brush-arm assembly 176 are engageable to facilitate selectively releasable coupling of cap 196 to drive-element housing 179 of brush-arm assembly 176. With receptacle 205 concentrically positioned relative to first drive element 292, receptacle 205 is positioned to facilitate reception of a portion of hollow shaft 222 of brush 298 extending through first drive element 292.

In some examples, retention element 210 is a protrusion, such as a fastener with a head and a shaft, and retention slot 200 has a substantially T-shaped cross-section to receive both the head and at least a portion of the shaft of the fastener.

Referring generally to FIGS. 1A and 1B and particularly to, e.g., FIGS. 9 and 12, retention slot 200 is curved. The preceding subject matter of this paragraph characterizes example 51 of the present disclosure, wherein example 51 also includes the subject matter according to example 50, above.

Curvature of slot 200 enables cap 196 to engage retention element 210 of brush-arm assembly 176 while cap 196 is rotated about first rotation axis 187 of first drive element 292.

Referring generally to FIGS. 1A and 1B and particularly to, e.g., FIGS. 2-6, system 100 for delivering glutinous substance 168 from cartridge 166 to surface 172 of workpiece 170 is disclosed. System 100 comprises robot 152, comprising tool interface 156. System 100 also comprises brush 298 and apparatus 102 for delivering glutinous substance 168 from cartridge 166 to brush 298. Apparatus 102 comprises robot interface 136, configured to be coupled to tool interface 156 of robot 152. Apparatus 102 further comprises sleeve 106, comprising central axis 121. Additionally, sleeve 106 comprises inlet 124 and outlet 128, opposite inlet 124. Sleeve 106 is configured to receive cartridge 166 through inlet 124. Apparatus 102 additionally comprises valve interface 108, coupled to sleeve 106 proximate outlet 128 of sleeve 106. Apparatus 102 also comprises valve 154, configured to be coupled with valve interface 108. Apparatus 102 additionally comprises pressure-cap assembly 104, coupled to sleeve 106. Pressure-cap assembly 104 comprises pressure cap 110, proximate inlet 124 of sleeve 106. With cartridge 166 received within sleeve 106, pressure cap 110 is movable between, inclusively, a closed position, in which pressure cap 110 is in sealed engagement with trailing end 169 of cartridge 166, and an open position, in which pressure cap 110 provides clearance sufficient for insertion of cartridge 166 inside sleeve 106 through inlet 124. Pressure cap 110 comprises pressure input 118, selectively operable to apply pressure to glutinous substance 168 in cartridge 166 when cartridge 166 is received within sleeve 106, pressure cap 110 is in the closed position, and leading end 167 of cartridge 166 is in sealed engagement with valve 154. Pressure-cap assembly 104 also comprises actuator 114, coupled to pressure cap 110 and to sleeve 106. Actuator 114 is selectively operable to move pressure cap 110 relative to sleeve 106 between, inclusively, the closed position and the open position. Apparatus 102 also comprises brush-arm assembly 176, coupled with sleeve 106 and configured to retain and rotate brush 298. Valve 154 is selectively operable, when the pressure is applied to glutinous substance 168 in cartridge 166, to enable glutinous substance 168 to flow from cartridge 166 to brush 298 when brush 298 is releasably retained by brush-arm assembly 176 and when brush-arm assembly 176 rotates brush 298. The preceding subject matter of this paragraph characterizes example 52 of the present disclosure.

System 100 is configured to facilitate a reduction in the labor, time, and inaccuracies associated with the application of glutinous substances onto surfaces of workpieces. Cartridge 166 of apparatus 102 provides modular containment of glutinous substance 168. Sleeve 106 of apparatus 102 enables a secure coupling of cartridge 166 to apparatus 102. Pressure-cap assembly 104 allows both access to sleeve 106 for the insertion of cartridge 166 into sleeve 106 and the application of pressure to cartridge 166 for urging glutinous substance 168 out of sleeve 106. Actuator 114 facilitates automated actuation of pressure-cap assembly 104. Valve interface 108 enables secure attachment of valve 154 to apparatus 102 and quick release of valve 154 from apparatus 102. With cartridge 166 received within sleeve 106 and pressure cap 110 in a closed position, cartridge 166 is sealed with valve 154 to enable sealed flow of glutinous substance 168 from cartridge 166 to valve 154 via the application of pressure to glutinous substance 168 in cartridge 166. Brush-arm assembly 176 enables rotation of brush 298 and facilitates delivery of glutinous substance 168 to brush 298 while brush 298 is rotating.

Apparatus 102 can include pressure tubes 138 to facilitate the communication of pressure to and from various components of apparatus 102. For example, pressure tubes 138 may communicate pressure to pressure inputs 118. As an example, pressure tubes 138 may communicate pressure to and from actuator 114 to facilitate selective operation of actuator 114. Also, pressure tubes 138 may communicate pressure to pressure inputs 130 to control operation of valve 154, such as opening and closing of valve 154.

In some examples, various components of apparatus 102 are fixed to sleeve 106 via clamps 116, 132. For example, actuator 114 is fixed to sleeve 106 by clamp 116 and valve interface 108 is fixed to sleeve 106 by tube 194 secured about sleeve 106 by clamp 132. According to other examples, the various components of apparatus 102 are fixed to sleeve 106 using other fixation techniques, such as fastening, adhering, co-forming, and the like.

Actuator 114 can be any of various actuators known in the art, such as linear actuators and rotary actuators, powered in any of various ways, such as pneumatically, electromagnetically, electrically, hydraulically, and the like. Pressure inputs 118, 130 can be pneumatic fittings in some examples. As used herein, a central axis of an object is a longitudinal symmetry axis of the object.

Referring generally to FIGS. 1A and 1B and particularly to, e.g., FIG. 3, system 100 further comprises pressure source 162, configured to selectively provide pressure to tool interface 156 of robot 152. Tool interface 156 of robot 152 is configured to pneumatically communicate the pressure, received from pressure source 162, to robot interface 136 of apparatus 102. Robot interface 136 of apparatus 102 is configured to pneumatically communicate the pressure, received from tool interface 156 of robot 152, to pressure input 118 of pressure cap 110 and to actuator 114. The preceding subject matter of this paragraph characterizes example 53 of the present disclosure, wherein example 53 also includes the subject matter according to example 52, above.

Robot interface 136 and tool interface 136 enable reliable pneumatic communication of pressure from pressure source 162 to apparatus 102 for pneumatic operation of apparatus 102. Furthermore, robot interface 136 and tool interface 156 promote quick coupling of apparatus 102 with robot 152 and quick releasing of apparatus 102 from robot 152. Additionally, robot interface 136 and tool interface 156 facilitate quick coupling of communication lines between apparatus 102 and robot 152. For example, robot interface 136 and tool interface 156 may enable automated coupling of apparatus 102 with robot 152 and automated releasing of apparatus 102 from robot 152.

Referring generally to FIGS. 1A and 1B and particularly to, e.g., FIGS. 2 and 7, system 100 further comprises pressure sensor 158, configured to sense pressure of glutinous substance 168 in valve 154. System 100 also comprises pressure-signal conditioner 144, electrically coupled to pressure sensor 158. Additionally, system 100 comprises controller 157, operatively coupled with pressure source 162. Controller 157 is configured to regulate the pressure, communicated from pressure source 162 to pressure input 118 of pressure cap 110 via tool interface 156 of robot 152 and robot interface 136 of apparatus 102. Also, controller 157 is configured to regulate the pressure responsive to, at least in part, pressure data received from pressure-signal conditioner 144. The preceding subject matter of this paragraph characterizes example 54 of the present disclosure, wherein example 54 also includes the subject matter according to example 53, above.

Pressure sensor 158 enables detection of the pressure of glutinous substance 168 in valve 154. The pressure of glutinous substance 168 in valve 154 detected by pressure sensor 158 can be used by controller 157 to control the rate at which glutinous substance 168 flows from cartridge 166 to valve 154. Further, pressure sensor 158 being configured to be coupled to valve 154 allows pressure sensor 158 to remain part of apparatus 102 while being decoupleable from valve 154 to remove valve 154 from apparatus 102 or being coupleable to valve 154 after valve 154 is coupled to apparatus 102.

Pressure-signal conditioner 144 enables communication of pressure-related information from pressure sensor 158 to controller 157 in a format useable by controller 157. Accordingly, pressure-signal conditioner 144 provides data format conversion functionality on-board apparatus 102, rather than at controller 157.

Using controller 157 to regulate the pressure communicated from pressure source 162 responsive to, at least in part, at least one of pressure data, received from pressure-signal conditioner 144, facilitates a precise and predictable flow of glutinous substance 168 from brush 298 to surface 172 of workpiece 170.

Referring generally to FIGS. 1A and 1B and particularly to, e.g., FIGS. 2, 4, 6, and 7, the pressure, communicated to pressure input 118, is that inside sleeve 106. The pressure inside sleeve 106 regulates a delivery rate of glutinous substance 168 from cartridge 166 to brush 298. The preceding subject matter of this paragraph characterizes example 55 of the present disclosure, wherein example 55 also includes the subject matter according to example 54, above.

Regulating the pressure communicated from pressure source 162 to regulate the delivery rate of glutinous substance 168 from cartridge 166 to brush 298 facilitates a precise and predictable flow of glutinous substance 168 from brush 298 to surface 172 of workpiece 170.

Referring generally to FIGS. 1A and 1B and particularly to, e.g., FIGS. 4, 5, and 7, system 100 further comprises input/output connector 140, communicatively coupling pressure-signal conditioner 144 with controller 157. The preceding subject matter of this paragraph characterizes example 56 of the present disclosure, wherein example 56 also includes the subject matter according to any one of examples 54 or 55, above.

Input/output connector 140 facilitates a convenient and reliable electrical-communication connection between controller 157 and pressure-signal conditioner.

Referring generally to FIGS. 1A and 1B and particularly to, e.g., FIG. 2, the pressure is at a first pressure. Pressure source 162 comprises air amplifier 165, configured to increase the pressure from the first pressure to a second pressure. Pressure source 162 is configured to selectively provide the first pressure to tool interface 156 of robot 152 and to selectively provide the second pressure to tool interface 156 of robot 152. Tool interface 156 of robot 152 is configured to pneumatically communicate the first pressure, received from pressure source 162, to robot interface 136 of apparatus 102 and to pneumatically communicate the second pressure, received from pressure source 162, to robot interface 136 of apparatus 102. Robot interface 136 of apparatus 102 is configured to pneumatically communicate the first pressure, received from tool interface 156 of robot 152, to actuator 114 and to pneumatically communicate the second pressure, received from tool interface 156 of robot 152, to pressure input 118 of pressure cap 110. The preceding subject matter of this paragraph characterizes example 57 of the present disclosure, wherein example 57 also includes the subject matter according to any one of examples 53-56, above.

Air amplifier 165 enables pneumatic communication of multiple pressures from pressure source 162 to apparatus 102 for pneumatically operating multiple components of apparatus 102. Robot interface 136 and tool interface 156 promote quick coupling of apparatus 102 with robot 152 and quick releasing of apparatus 102 from robot 152. Additionally, robot interface 136 and tool interface 156 facilitate quick coupling of communication lines between apparatus 102 and robot 152. For example, robot interface 136 and tool interface 156 may enable automated coupling of apparatus 102 with robot 152 and automated releasing of apparatus 102 from robot 152.

Air amplifier 165 can be configured to provide pressures up to, for example, 300 psi. In some examples, air amplifier 165 includes a manifold with independently-controllable valves each configured to regulate air flow to different locations of tool interface 156.

Referring generally to FIGS. 1A and 1B and particularly to, e.g., FIGS. 5, 8, 10, and 11, brush-arm assembly 176 comprises first drive element 292, rotatable about first rotation axis 187. First drive element 292 comprises brush receptacle 147, comprising internal splines 149. Brush 298 comprises engagement portion 234, receivable within brush receptacle 147. Engagement portion 234 of brush 298 is at least partially deformable against internal splines 149 of brush receptacle 147 when engagement portion 234 of brush 298 is received within brush receptacle 147 of first drive element 292 to releasably retain engagement portion 234 of brush 298 within brush receptacle 147 of first drive element 292 along first rotational axis 187 and to prevent rotation of brush 298 relative to first drive element 292. The preceding subject matter of this paragraph characterizes example 58 of the present disclosure, wherein example 58 also includes the subject matter according to any one of the examples 52-57, above.

Internal splines 149 enable an interference fit between brush receptacle 147 and engagement portion 234 of brush 298. In one example, internal splines 149 at least partially penetrate into engagement portion 234 of brush 298 to at least partially deform engagement portion 234 and promote the interference fit.

Referring generally to FIGS. 1A and 1B and particularly to, e.g., FIG. 11, engagement portion 234 of brush 298 is made of a polymeric material. The preceding subject matter of this paragraph characterizes example 59 of the present disclosure, wherein example 59 also includes the subject matter according to example 58, above.

Polymeric material of engagement portion 234 provides rigidity while allowing internal splines 149 of brush receptacle 147 to deform engagement portion 234.

Referring generally to FIGS. 1A and 1B and particularly to, e.g., FIGS. 5 and 8, brush-arm assembly 176 comprises motor 178, operatively coupled with first drive element 292 and selectively operable to rotate first drive element 292. The preceding subject matter of this paragraph characterizes example 60 of the present disclosure, wherein example 60 also includes the subject matter according to any one of examples 58 or 59, above.

Motor 178 being operatively coupled with first drive element 292 and brush 298 being co-rotatably coupleable with first drive element 292 enables motor 178 to selectively rotate brush 298.

Referring generally to FIGS. 1A and 1B and particularly to, e.g., FIGS. 2-11, apparatus 102 further comprises substance-delivery tube 174, communicatively coupling valve 154 with brush 298. The preceding subject matter of this paragraph characterizes example 61 of the present disclosure, wherein example 61 also includes the subject matter according to any one of examples 58-60, above.

Substance-delivery tube 174 enables the delivery of glutinous substance 168 from valve 154 to brush 298. Additionally, substance-delivery tube 174 provides for the delivery of glutinous substance 168 from valve 154 to brush 298 along a path external to the shaft housing 177 and drive-element housing 179 to enable the simplification and efficiency of transmitting power from motor 178 to first drive element 292.

Referring generally to FIGS. 1A and 1B and particularly to, e.g., FIGS. 2-11, valve 154 is selectively operable to allow glutinous substance 168 to flow from valve 154 to brush 298 through substance-delivery tube 174 when brush 298 is releasably retained by brush-arm assembly 176 and when brush-arm assembly 176 rotates brush 298. The preceding subject matter of this paragraph characterizes example 62 of the present disclosure, wherein example 62 also includes the subject matter according to example 61, above.

Substance-delivery tube 174 enables selective delivery of glutinous substance 168 from valve 154 to brush 298 when brush 298 is rotating.

Referring generally to FIGS. 1A and 1B and particularly to, e.g., FIGS. 2-4, 6, and 8-12, system 100 further comprises cap 196, configured to be releasably coupled to brush-arm assembly 176. Cap 196 is configured to direct glutinous substance 168 from substance-delivery tube 174 to brush 298 when brush 298 is releasably retained by brush-arm assembly 176 and when brush-arm assembly 176 rotates brush 298. The preceding subject matter of this paragraph characterizes example 63 of the present disclosure, wherein example 63 also includes the subject matter according to any one of the examples 61 or 62, above.

Cap 196 enables glutinous substance 168 to flow from substance-delivery tube 174 to brush 298 while brush 298 is rotating. Moreover, in some examples, cap 196 promotes a leak-free delivery of glutinous substance 168 from substance-delivery tube 174 to brush 298 while brush 298 is rotating.

Referring generally to FIGS. 1A and 1B and particularly to, e.g., FIG. 11, brush 298 comprises hollow shaft 222. The preceding subject matter of this paragraph characterizes example 64 of the present disclosure, wherein example 64 also includes the subject matter according to example 63, above.

Hollow shaft 222 of brush 298 enables glutinous substance 169 to flow from cap 196 to surface 172 of workpiece 172 through brush 298. In some examples, hollow shaft 222 of brush 298 is in fluid communication with bristles 220 of brush 298 to facilitate flow of glutinous substance 169 from cap 196 to bristles 220 of brush 220.

Referring generally to FIGS. 1A and 1B and particularly to, e.g., FIG. 11, hollow shaft 222 of brush 298 is made of metal. The preceding subject matter of this paragraph characterizes example 65 of the present disclosure, wherein example 65 also includes the subject matter according to example 64, above.

Hollow shaft 222 of brush 298 being made of metal enables rotation of brush 298 at high speeds without sacrificing structural integrity of hollow shaft 222 due to frictionally-induced temperature increases.

Referring generally to FIGS. 1A and 1B and particularly to, e.g., FIGS. 2-4, 6, and 8-12, cap 196 comprises channel 202, extending through cap 196. Channel 202 is circumferentially closed. Glutinous substance 168 moves from substance-delivery tube 174 through channel 202 of cap 196 to brush 298 when brush 298 is releasably retained by brush-arm assembly 176 and when brush-arm assembly 176 rotates brush 298. The preceding subject matter of this paragraph characterizes example 66 of the present disclosure, wherein example 66 also includes the subject matter according to any one of examples 64 or 65, above.

Channel 202 of cap 196, being circumferentially closed, enables containment of glutinous substance 168 as glutinous substance 168 moves from substance-delivery tube 174 to brush 298. Moreover, in some examples, a cross-sectional area of channel 202 of cap 196 decreases in a direction from substance-delivery tube 174 to brush 298.

Referring generally to FIGS. 1A and 1B and particularly to, e.g., FIGS. 10 and 11, cap 196 further comprises gasket 204, configured to form a seal with hollow shaft 222 of brush 176. Hollow shaft 222 is rotatable relative to gasket 204. The preceding subject matter of this paragraph characterizes example 67 of the present disclosure, wherein example 67 also includes the subject matter according to example 66, above.

Gasket 204 enables containment of glutinous substance 168 within cap 196 while allowing for rotation of brush 176 relative to cap 196. In some examples, gasket 204 is configured to form a first seal with hollow shaft 222, while hollow shaft 222 rotates, and form a second seal with cap 196. In some examples, cap 196 comprises multiple gaskets 204 to enhance the containment of glutinous substance 168 within cap 196 while allowing for rotation of brush 176 relative to cap 196.

Referring generally to FIGS. 1A and 1B and particularly to, e.g., FIGS. 10-12, cap 196 further comprises first receptacle 205, communicatively coupled with channel 202 and configured to receive hollow shaft 222 of brush 298. Gasket 204 is received within first receptacle 205. The preceding subject matter of this paragraph characterizes example 68 of the present disclosure, wherein example 68 also includes the subject matter according to example 67, above.

First receptacle 205 facilitates physical and fluid coupling between channel 202 of cap 196 and hollow shaft 222 of brush 298. Gasket 204 helps to ensure glutinous substance 168 from channel 202 does not flow entirely between first receptacle 205 of cap 196 and hollow shaft 222.

In some examples, first receptacle 205 of cap 196 includes gasket receiving portion 206 that mateably receives gasket 104 within first receptacle 205.

Referring generally to FIGS. 1A and 1B and particularly to, e.g., FIGS. 9-12, cap 196 further comprises retention slot 200. Brush-arm assembly 176 further comprises retention element 210, configured to engage retention slot 200 when cap 196 is in contact with brush-arm assembly 176 and first receptacle 205 of cap 196 is concentrically positioned relative to first drive element 292. The preceding subject matter of this paragraph characterizes example 69 of the present disclosure, wherein example 69 also includes the subject matter according to example 68, above.

Retention slot 200 of cap 196 and retention element 210 of brush-arm assembly 176 are engageable to facilitate selectively releasable coupling of cap 196 to drive-element housing 179 of brush-arm assembly 176. With receptacle 205 concentrically positioned relative to first drive element 292, receptacle 205 is positioned to facilitate reception of a portion of hollow shaft 222 of brush 298 extending through first drive element 292.

Referring generally to FIGS. 1A and 1B and particularly to, e.g., FIGS. 5 and 7, valve interface 108 of apparatus 100 comprises receptacle 182. Valve 154 comprises receptacle interface 198. Receptacle 182 of valve interface 108 and receptacle interface 198 of valve 154 have a running fit therebetween. The preceding subject matter of this paragraph characterizes example 70 of the present disclosure, wherein example 70 also includes the subject matter according to any one of examples 52-69, above.

The running fit between receptacle 182 of valve interface 108 and receptacle interface 198, along with retainer 184, ensures valve 154 is securely coupled to valve interface 108 by providing a sufficiently tight fit between receptacle 182 of valve interface 108 and receptacle interface 198 of valve 154 to prevent noticeable play therebetween. As used herein, a running fit between two parts produces no noticeable clearance between these parts after assembly.

Referring generally to FIGS. 1A and 1B and particularly to, e.g., FIGS. 5 and 7, receptacle 182 of valve interface 108 and receptacle interface 198 of valve 154 have cross-sectionally complementary shapes. The preceding subject matter of this paragraph characterizes example 71 of the present disclosure, wherein example 71 also includes the subject matter according to example 70, above.

Receptacle 182 of valve interface 108 having a shape that is cross-sectionally complementary to a shape of receptacle interface 198 of valve 154, along with retainer 184, ensures valve 154 is securely coupled to valve interface 108 by providing a relatively tight fit between receptacle 182 of valve interface 108 and receptacle interface 198 of valve 154.

Referring generally to FIGS. 1A and 1B and particularly to, e.g., FIGS. 5 and 7, a cross-section of receptacle 182 of valve interface 108, perpendicular to central axis 121 of sleeve 106, is non-circular. The preceding subject matter of this paragraph characterizes example 72 of the present disclosure, wherein example 72 also includes the subject matter according to any one of examples 70 or 71, above.

The cross-section of receptacle 182 of valve interface 108 being non-circular ensures valve 154 does not rotate relative to valve interface 108.

Referring generally to FIGS. 1A and 1B and particularly to, e.g., FIGS. 5 and 7, valve interface 108 comprises retainer 184. Retainer 184 is rotatable relative to receptacle 182 of valve interface 108 and receptacle interface 198 of valve 154 when receptacle interface 198 of valve 154 is received within receptacle 182 of valve interface 108. Retainer 184 of valve interface 108 is rotatable between at least one first position, in which retainer 184 engages receptacle interface 198 of valve 154 to retain valve 154, and at least one second position, in which retainer 184 provides clearance sufficient for receptacle interface 198 of valve 154 to be removed from or received within receptacle 182 of valve interface 108. The preceding subject matter of this paragraph characterizes example 73 of the present disclosure, wherein example 73 also includes the subject matter according to any one of examples 70-72, above.

Use of retainer 184 allows for quick and easy secure coupling of valve 154 to valve interface 108 and decoupling of valve 154 from valve interface 108. Retainer 184 can be reoriented between the at least one retaining orientation and the at least one releasing orientation to allow for secure coupling of valve 154 to valve interface 108 and decoupling of valve 154 from valve interface 108. In one example, retainer 184 is a disk-like element that is rotatable to orient retainer 184 between the at least one retainer orientation and the at least one releasing orientation.

Referring generally to FIGS. 1A and 1B and particularly to, e.g., FIGS. 5 and 7, receptacle interface 198 of valve 154 comprises receiver 199, configured to receive and sealingly engage leading end 167 of cartridge 166. The preceding subject matter of this paragraph characterizes example 74 of the present disclosure, wherein example 74 also includes the subject matter according to any one of examples 70-73, above.

Reception of leading end 167 of cartridge 166 in receiver 199 of receptacle interface 198 of valve 154 and sealing engagement of leading end 167 of cartridge 166 in receiver 199 of receptacle interface 198 of valve 154 ensures glutinous substance 168 does not leak from interface between leading end 167 of cartridge 166 and valve 154 as glutinous substance 168 flows from cartridge 166 to valve 154.

Referring generally to, e.g., FIGS. 1A-6 and particularly to FIG. 13A, method 300 of delivering glutinous substance 168 from cartridge 166 to brush 298 is disclosed. Method 300 comprises (block 302) receiving cartridge 166 inside a sleeve 106 through inlet 124 of sleeve 106 while pressure cap 110, located proximate inlet 124 of sleeve 106, is in an open position. Cartridge 166 has leading end 167 and trailing end 169. Method 300 also comprises (block 304) moving pressure cap 110, located proximate inlet 124 of sleeve 106, into a closed position to sealingly couple pressure cap 110 with trailing end 169 of cartridge 166 and to sealingly couple valve 154 with leading end 167 of cartridge 166. Method 300 further comprises (block 306) applying pressure to glutinous substance 168 in cartridge 166 through pressure input 118 of pressure cap 110 to urge glutinous substance 168 from cartridge 166 to valve 154. Method 300 additionally comprises (block 308) rotating brush 298. Also, method 300 comprises (block 310) opening valve 154 to enable glutinous substance 168 to flow from valve 154 to brush 298 at least when brush 298 is rotating. The preceding subject matter of this paragraph characterizes example 75 of the present disclosure.

Method 300 facilitates a reduction in the labor, time, and inaccuracies associated with the application of glutinous substances onto surfaces of workpieces. Cartridge 166 provides modular containment of glutinous substance 168. Sleeve 106 enables a secure coupling of cartridge 166 relative to valve 154. Movement of pressure cap 110 between the open position and closed position allows both access to sleeve 106 for the insertion of cartridge 166 into sleeve 106 and the application of pressure to cartridge 166 for urging glutinous substance 168 out of sleeve 106. With cartridge 166 received within sleeve 106 and pressure cap 110 in a closed position, cartridge 166 is sealed with valve 154 to enable sealed flow of glutinous substance 168 from cartridge 166 to valve 154 via the application of pressure to glutinous substance 168 in cartridge 166. Opening valve 154 to enable glutinous substance 168 to flow from valve 154 to brush 298 facilitates the delivery of glutinous substance 168 to surface 172 of workpiece 170 through brush 298 while brush 298 is rotating.

Referring generally to, e.g., FIGS. 1A-6 and particularly to FIG. 13A, according to method 300, (block 312) pressure cap 110 is pivotally coupled to arm 115. Moving pressure cap 110 into the closed position comprises (block 314) rotating arm 115 in a first rotational direction about axis 117. Axis 117 is fixed relative to sleeve 106 and perpendicular to central axis 121 of sleeve 106. The preceding subject matter of this paragraph characterizes example 76 of the present disclosure, wherein example 76 also includes the subject matter according to example 75, above.

Arm 115, being pivotable about axis 117 that is fixed relative to sleeve 106 and is perpendicular to central axis 121 of sleeve 106, enables pressure cap 110 to be moved between the closed position, to sealingly engage trailing end 169 of cartridge 166, and the open position, to provide clearance sufficient for insertion of cartridge 166 inside sleeve 106 through inlet 124 of sleeve 106 and ejection of cartridge 166 from sleeve 106. In other words, arm 115 allows pressure cap 110 to be pivoted into sealed engagement with cartridge 166 and pivoted away from cartridge 166 to allow cartridge 166 to be inserted into or removed from sleeve 106.

Referring generally to, e.g., FIGS. 1A-6 and particularly to FIG. 13A, according to method 300, moving pressure cap 110 into the closed position comprises (block 316) torsionally biasing pressure cap 110 relative to arm 115. The preceding subject matter of this paragraph characterizes example 77 of the present disclosure, wherein example 77 also includes the subject matter according to example 76, above.

Because arm 115, to which pressure cap 110 is coupled, rotates to move pressure cap 110 into the closed positioned, in sealed engagement with trailing end 169 of cartridge 166, enabling pressure cap 110 to pivot relative to arm 115 allows pressure cap 110 to maintain coaxial alignment with trailing end 169 of cartridge 166 as arm 115 rotates. By torsionally biasing pressure cap 110, biasing element 122 ensures pressure cap 110 is coaxially aligned with trailing end 169 of cartridge 166 as pressure cap 110 initially engages trailing end 169 of cartridge 166. In this manner, pressure cap 110 can properly engage and seat within trailing end 169 of cartridge 166 without binding with or crookedly entering trailing end 169 of cartridge 166.

Referring generally to, e.g., FIGS. 1A-4 and 6 and particularly to FIG. 13A, method 300 further comprises (block 322) releasably locking pressure cap 110 in the closed position. The preceding subject matter of this paragraph characterizes example 78 of the present disclosure, wherein example 78 also includes the subject matter according to any one of examples 76 or 77, above.

Releasably locking pressure cap 110 in the closed position prevents disengagement between pressure cap 110 and cartridge 166 should actuator 114 fail. In other words, in the event actuator 114 fails to urge pressure cap 110 in closed position, such as due to loss of pressure to or malfunction of actuator 114, while pressure is applied to glutinous substance 168 in cartridge 166, releasably locking pressure cap 110 in the closed position prevents pressure within cartridge 116 from inadvertently moving pressure cap 110 out of the closed position.

Referring generally to, e.g., FIGS. 1A-4 and 6 and particularly to FIGS. 13A and 13B, according to method 300, moving pressure cap 110 into the closed position comprises (block 318) pneumatically causing actuator 114 to have a first length. Actuator 114 is coupled to pressure cap 110. Releasably locking pressure cap 110 in the closed position comprises (block 324) mechanically locking pressure cap 110 in the closed position. The preceding subject matter of this paragraph characterizes example 79 of the present disclosure, wherein example 79 also includes the subject matter according to example 78, above.

Actuator 114 facilitates automated movement of pressure cap 110 into the closed position. Mechanically locking pressure cap 110 in the closed position provides a secure and reliable way to prevent disengagement between pressure cap 110 and cartridge 166 should actuator 114 fail.

Referring generally to, e.g., FIGS. 1A-4 and 6 and particularly to FIG. 13A, according to method 300, (block 326) lock mechanism 112 is used to mechanically lock pressure cap 110 in the closed position. When lock mechanism 112 is in a locked position, (block 326) lock mechanism 112 remains in the locked position if actuator 114 loses pressure. The preceding subject matter of this paragraph characterizes example 80 of the present disclosure, wherein example 80 also includes the subject matter according to example 79, above.

Using lock mechanism 112 to mechanically lock pressure cap 110 in the closed position prevents disengagement between pressure cap 110 and cartridge 166 should actuator 114 fail. In other words, in the event actuator 114 fails to urge pressure cap 110 in closed position, such as due to loss of pressure to or malfunction of actuator 114, while pressure is applied to glutinous substance 168 in cartridge 166, lock mechanism 112 locks pressure cap 110 in the closed position to prevent pressure within cartridge 116 from inadvertently moving pressure cap 110 out of the closed position.

Referring generally to, e.g., FIGS. 1A-4 and 6 and particularly to FIG. 13B, method 300 further comprises (block 332) moving pressure cap 110 into an open position to provide clearance sufficient for removal of cartridge 166 from sleeve 106 through inlet 124 of sleeve 106. The preceding subject matter of this paragraph characterizes example 81 of the present disclosure, wherein example 81 also includes the subject matter according to any one of examples 79 or 80, above.

Moving pressure cap 110 into the open position enables removal of cartridge 166 from sleeve 106 and enables insertion of cartridge 166 into sleeve 106 without obstruction by pressure cap 110.

Referring generally to, e.g., FIGS. 1A-4 and 6 and particularly to FIG. 13B, according to method 300, moving pressure cap 110 into the open position comprises (block 334) pneumatically causing actuator 114 to have a second length different from the first length. The preceding subject matter of this paragraph characterizes example 82 of the present disclosure, wherein example 82 also includes the subject matter according to example 84, above.

Actuator 114 facilitates automated movement of pressure cap 110 into the open position.

Referring generally to, e.g., FIGS. 1A-4 and 6 and particularly to FIG. 13B, according to method 300, moving pressure cap 110 into the open position comprises (block 336) rotating arm 115 about axis 117 in a second rotational direction, opposite the first rotational direction. The preceding subject matter of this paragraph characterizes example 83 of the present disclosure, wherein example 83 also includes the subject matter according to any one of examples 81 or 82, above.

Arm 115, being pivotable about axis 117 that is fixed relative to sleeve 106 and is perpendicular to central axis 121 of sleeve 106, enables pressure cap 110 to be moved to the open position, to provide clearance sufficient for insertion of cartridge 166 inside sleeve 106 through inlet 124 of sleeve 106 and removal of cartridge 166 from sleeve 106. In other words, rotation of arm 115 allows pressure cap 110 to be moved away from cartridge 166 to allow cartridge 166 to be removed from sleeve 106.

Referring generally to, e.g., FIGS. 1A, 1B, and 5 and particularly to FIG. 13B, method 200 further comprises (block 330) disabling operation of actuator 114 while pressure is applied to glutinous substance 168 in cartridge 166 through pressure input 118 of pressure cap 110. The preceding subject matter of this paragraph characterizes example 84 of the present disclosure, wherein example 84 also includes the subject matter according to any one of examples 75-83, above.

Disabling operation of actuator 114 while pressure is being applied to glutinous substance 168 in cartridge 166 through pressure input 118 of pressure cap 110 prevents actuator 114 from inadvertently opening pressure cap 110 while cartridge 166 is pressurized. Preventing pressure cap 110 from opening while pressure is being applied to glutinous substance 168 due to inadvertent actuation of actuator 114 ensures pressure within cartridge 166 is not inadvertently released.

Referring generally to, e.g., FIGS. 1A-4 and 6 and particularly to FIG. 13A, according to method 300, applying pressure to glutinous substance 168 in cartridge 166 through pressure input 118 of pressure cap 110 comprises (block 320) introducing a pressurized gas into cartridge 166 through pressure input 118. The preceding subject matter of this paragraph characterizes example 85 of the present disclosure, wherein example 85 also includes the subject matter according to any one of examples 75-84, above.

Introducing a pressurized gas into cartridge 166 through pressure input 118 enables precise application of pneumatic pressure to glutinous substance 168 in cartridge 166 to precisely control the flow of glutinous substance 168 out of cartridge 166 and into valve 154. Moreover, introducing a pressurized gas into cartridge 166 through pressure input 118 facilitates the use of automated pneumatic controls to control the pneumatic operation of pressure input 118 of pressure cap 110.

Referring generally to, e.g., FIGS. 1A-4, 6, and 7 and particularly to FIG. 13B, method 300 further comprises (block 338) sensing a pressure of glutinous substance 168 in valve 154. The pressure applied to glutinous substance 168 in cartridge 166 through pressure input 118 of pressure cap 110 varies responsive to, at least in part, the pressure of glutinous substance 168 sensed in valve 154. The preceding subject matter of this paragraph characterizes example 86 of the present disclosure, wherein example 86 also includes the subject matter according to example 85, above.

Sensing the pressure of glutinous substance 168 enables detection of the pressure of glutinous substance 168 in valve 154. The sensed pressure of glutinous substance 168 in valve 154 can be used to control the rate at which glutinous substance 168 flows from cartridge 166 to valve 154. Varying the pressure applied to glutinous substance 168 in cartridge 166 responsive to, at least in part, the sensed pressure of glutinous substance 168 facilitates a precise and predictable flow of glutinous substance 168 from valve 154 to brush 298 and from brush 298 to surface 172 of workpiece 170.

Referring generally to, e.g., FIGS. 1A-5 and 7 and particularly to FIG. 13B, method 300 further comprises (block 340) releasably retaining valve 154 relative to sleeve 106. The preceding subject matter of this paragraph characterizes example 87 of the present disclosure, wherein example 87 also includes the subject matter according to example 86, above.

Releasably retaining valve 154 relative to sleeve 106 promotes ease in removing valve 154 relative to sleeve 106 and retaining valve 154 relative to sleeve 106. In some examples, releasably retaining valve 154 relative to sleeve 106 promotes interchangeability of multiple valves 154 relative to sleeve 106.

Referring generally to, e.g., FIGS. 1A-5 and 7 and particularly to, e.g., FIG. 13B, according to method 300, releasably retaining valve 154 relative to sleeve 106 comprises (block 342) locating receptacle interface 230 of valve 154 within receptacle 232, fixed relative to sleeve 106, with a running fit. The preceding subject matter of this paragraph characterizes example 88 of the present disclosure, wherein example 88 also includes the subject matter according to example 87, above.

The running fit between receptacle 182 of valve interface 108 and receptacle interface 198, along with retainer 184, ensures valve 154 is securely coupled to valve interface 108 by providing a sufficiently tight fit between receptacle 182 of valve interface 108 and receptacle interface 198 of valve 154 to prevent noticeable play therebetween.

Referring generally to, e.g., FIGS. 1A, 1B, 5, and 7 and particularly to FIG. 13B, according to method 300, locating receptacle interface 230 of valve 154 within receptacle 182 with the running fit comprises (block 344) additively manufacturing receptacle interface 230 of valve 154 into a shape larger than receptacle 182 and (block 346) machining away a portion of receptacle interface 230 of valve 154. The preceding subject matter of this paragraph characterizes example 89 of the present disclosure, wherein example 89 also includes the subject matter according to example 88, above.

Additively manufacturing receptacle interface 198 of valve 154 into a shape larger than receptacle 182 and machining away a portion of receptacle interface 198 of valve 154 reduces manufacturing and material costs, while ensuring receptacle interface 198 of valve 154 and receptacle 182 provide a running fit.

Referring generally to, e.g., FIGS. 1A, 1B, 5, 8, 10, and 11 and particularly to FIG. 13B, method 300 further comprises (block 348) co-rotatably coupling brush 298 with first drive element 292 and (block 350) rotating first drive element 292 via selective operation of motor 178. The preceding subject matter of this paragraph characterizes example 90 of the present disclosure, wherein example 90 also includes the subject matter according to any one of examples 75-89, above.

Motor 178 being selectively operable to rotate first drive element 292, co-rotatably coupled to brush 298, enables motor 178 to selectively rotate brush 298.

Referring generally to, e.g., FIGS. 1A, 1B, 5, 8, 10, and 11 and particularly to FIG. 13B, according to method 300, rotating first drive element 292 comprises (block 352) rotating second drive element 188. Second drive element 188 is co-rotatably coupled with first drive element 292 via power-transmission component 190. The preceding subject matter of this paragraph characterizes example 91 of the present disclosure, wherein example 91 also includes the subject matter according to example 90, above.

Second drive element 188 and power-transmission component 190 facilitate the transmission of power from motor 178 to first drive element 292.

Referring generally to, e.g., FIGS. 1A-6 and 8 and particularly to FIG. 13B, method 300 further comprises (block 354) selectively adjusting a position of brush 298 relative to motor 178 while maintaining a constant distance between brush 298 and motor 178. The preceding subject matter of this paragraph characterizes example 92 of the present disclosure, wherein example 92 also includes the subject matter according to any one of examples 90 or 91, above.

Selective adjustability of the position of brush 298 relative to motor 178 helps to accommodate the delivery of glutinous substance 168 from brush 298 to workpieces of different sizes and shapes. Maintaining the constant distance between brush 198 and motor 178, while selectively adjusting the position of brush 198 relative to motor 178, allows power transmission from motor 178 to brush 298 without adjustment to power transmission features transmitting power from motor 178 to brush 298.

Referring generally to, e.g., FIGS. 1A, 1B, 5, 8, and 11 and particularly to FIG. 13C, method 300 further comprises (block 356) releasably coupling brush 298 with first drive element 292. The preceding subject matter of this paragraph characterizes example 93 of the present disclosure, wherein example 93 also includes the subject matter according to any one of examples 90-92, above.

Releasably coupling brush 198 with first drive element 292 allows brush 298 to be quickly and easily retained by first drive element 292 and removed from first drive element 292.

Referring generally to, e.g., FIGS. 1A, 1B, 10, and 11 and particularly to FIG. 13C, according to method 300, (block 358) first drive element 292 comprises internal splines 149. Releasably coupling brush 298 with first drive element 292 comprises (block 360) at least partially deforming engagement portion 234 of brush 298 against internal splines 149 of first drive element 292. The preceding subject matter of this paragraph characterizes example 94 of the present disclosure, wherein example 94 also includes the subject matter according to example 93, above.

Internal splines 149 enable an interference fit between brush receptacle 147 and engagement portion 234 of brush 298. In one example, internal splines 149 at least partially penetrate into engagement portion 234 of brush 298 to at least partially deform engagement portion 234 and promote the interference fit.

Referring generally to, e.g., FIGS. 1A, 1B, 10, and 11 and particularly to FIG. 13C, according to method 300, (block 362) first drive element 292 comprises annular internal shoulder 264. Releasably coupling brush 298 with first drive element 292 comprises (block 364) inserting brush 298 into first drive element 292 until brush 298 contacts annular internal shoulder 264. The preceding subject matter of this paragraph characterizes example 95 of the present disclosure, wherein example 95 also includes the subject matter according to any one of examples 93 or 94, above.

Annular internal shoulder 264 of first drive element 292 acts as a stop to properly position engagement portion 234 of brush 298 relative to first drive element 292 and cap 196, as well as to prevent over-insertion of engagement portion 234 of brush 298 into first drive element 292 and cap 196. In some examples, annular internal shoulder 264 of first drive element 292 comprises a sharp edge or corner that is configured to contact a flat surface of engagement portion 234 of brush 298 in a surface-to-line engagement (as opposed to a surface-to-surface engagement) to reduce optical contact bonding between annular internal shoulder 264 of first drive element 292 and engagement portion 234 of brush 298.

Referring generally to, e.g., FIGS. 1A-12 and particularly to FIG. 13C, method 300 further comprises (block 366) inserting a portion of brush 298 through first drive element 292. Method 300 also comprises (block 368) receiving the portion of brush 298 in first receptacle 205 of cap 196. Additionally, method 300 comprises (block 370) with the portion of brush 298 received in first receptacle 205 of cap 196, rotating cap 196 about first rotation axis 187 of first drive element 292 to releasably lock cap 196 relative to first rotation axis 187 of first drive element 292. According to method 200, (block 372) opening valve 154 enables glutinous substance 168 to flow from valve 154 to brush 298 through cap 196 when brush 298 is releasably coupled with first drive element 292 and when brush 298 is rotating. The preceding subject matter of this paragraph characterizes example 96 of the present disclosure, wherein example 96 also includes the subject matter according to any one of examples 93-95, above.

Cap 196 enables glutinous substance 168 to flow from valve 154 to brush 298 while brush 298 is rotating. Moreover, in some examples, cap 196 promotes a leak-free delivery of glutinous substance 168 from valve 154 to brush 298 while brush 298 is rotating. Retention slot 200 of cap 196 and retention element 210 of brush-arm assembly 176 are engageable to facilitate selectively releasable coupling of cap 196 to drive-element housing 179 of brush-arm assembly 176. With receptacle 205 concentrically positioned relative to first drive element 292, and hollow shaft 222 of brush 298 extending through first drive element 292 and into first receptacle 205 of cap 196, cap 196 is allowed to rotate about hollow shaft 222 of brush 298. As cap 196 rotates about hollow shaft 222, engagement between slot 200 of cap 196 and retention element 210 of brush-arm assembly 176 facilitates releasable locking of cap 196 relative to hollow shaft 222 and first rotation axis 187 of first drive element 292.

Referring generally to, e.g., FIGS. 1A-12 and particularly to FIG. 13C, according to method 300, (block 374) opening valve 154 enables glutinous substance 168 to flow from valve 154 into substance-delivery tube 174, communicatively coupled to brush 298. The preceding subject matter of this paragraph characterizes example 97 of the present disclosure, wherein example 97 also includes the subject matter according to any one of examples 75-96, above.

Substance-delivery tube 174 enables the delivery of glutinous substance 168 from valve 154 to brush 298. Additionally, substance-delivery tube 174 provides for the delivery of glutinous substance 168 from valve 154 to brush 298 along a path external to shaft housing 177 and drive-element housing 179 to enable the simplification and efficiency of transmitting power from motor 178 to first drive element 292.

Examples of the present disclosure may be described in the context of aircraft manufacturing and service method 1100 as shown in FIG. 14 and aircraft 1102 as shown in FIG. 15. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of delivering a glutinous substance from a cartridge to a brush, the method comprising:
receiving the cartridge inside a sleeve through an inlet of the sleeve while a pressure cap, located proximate the inlet of the sleeve, is in an open position, wherein the cartridge has a leading end and a trailing end;
moving the pressure cap, located proximate the inlet of the sleeve, into a closed position to sealingly couple the pressure cap with the trailing end of the cartridge and to sealingly couple a valve with the leading end of the cartridge;
applying pressure to the glutinous substance in the cartridge through a pressure input of the pressure cap to urge the glutinous substance from the cartridge to the valve;
rotating the brush;
opening the valve to enable the glutinous substance to flow from the valve to the brush at least when the brush is rotating;
co-rotatably coupling the brush with a first drive element;
rotating the first drive element via selective operation of a motor;
releasably coupling the brush with the first drive element;
inserting a portion of the brush through the first drive element;
receiving the portion of the brush in a first receptacle of a cap; and
with the portion of the brush received in the first receptacle of the cap, rotating the cap about a first rotation axis of the first drive element to releasably lock the cap relative to the first rotation axis of the first drive element; and
wherein opening the valve enables the glutinous substance to flow from the valve to the brush through the cap when the brush is releasably coupled with the first drive element and when the brush is rotating.

2. The method according to claim 1, wherein:
the pressure cap is pivotally coupled to an arm; and
moving the pressure cap into the closed position comprises rotating the arm in a first rotational direction about an axis, fixed relative to the sleeve and perpendicular to a central axis of the sleeve.

3. The method according to claim 2, wherein moving the pressure cap into the closed position comprises torsionally biasing the pressure cap relative to the arm.

4. The method according claim 2, further comprising releasably locking the pressure cap in the closed position.

5. The method according to claim 4, wherein:
moving the pressure cap into the closed position comprises pneumatically causing an actuator, coupled to the pressure cap, to have a first length; and
releasably locking the pressure cap in the closed position comprises mechanically locking the pressure cap in the closed position.

6. The method according to claim 5, wherein:
a lock mechanism is used to mechanically lock the pressure cap in the closed position; and
when the lock mechanism is in a locked position, the lock mechanism remains in the locked position if the actuator loses pressure.

7. The method according to claim 5, further comprising moving the pressure cap into an open position to provide clearance sufficient for removal of the cartridge from the sleeve through the inlet of the sleeve.

8. The method according to claim 7, wherein moving the pressure cap into the open position comprises pneumatically causing the actuator to have a second length different from the first length.

9. The method according to claim 7, wherein moving the pressure cap into the open position comprises rotating the arm about the axis in a second rotational direction, opposite the first rotational direction.

10. The method according to claim 5, further comprising disabling operation of the actuator while pressure is applied to the glutinous substance in the cartridge through the pressure input of the pressure cap.

11. The method according to claim 1, wherein applying pressure to the glutinous substance in the cartridge through the pressure input of the pressure cap comprises introducing a pressurized gas into the cartridge through the pressure input.

12. The method according to claim 11, further comprising sensing a pressure of the glutinous substance in the valve, wherein the pressure applied to the glutinous substance in the cartridge through the pressure input of the pressure cap varies responsive to, at least in part, the pressure of the glutinous substance sensed in the valve.

13. The method according to claim 12, further comprising releasably retaining the valve relative to the sleeve.

14. The method according to claim 13, wherein releasably retaining the valve relative to the sleeve comprises locating a receptacle interface of the valve within a receptacle, fixed relative to the sleeve, with a running fit.

15. The method according to claim 14, wherein locating the receptacle interface of the valve within the receptacle with the running fit comprises:
additively manufacturing the receptacle interface of the valve into a shape larger than the receptacle; and
machining away a portion of the receptacle interface of the valve.

16. The method according to claim 15, wherein rotating the first drive element comprises rotating a second drive element, co-rotatably coupled with the first drive element via a power-transmission component.

17. The method according to claim 15, further comprising selectively adjusting a position of the brush relative to the motor while maintaining a constant distance between the brush and the motor.

18. The method according to claim 17, wherein:
the first drive element comprises internal splines; and
releasably coupling the brush with the first drive element comprises at least partially deforming an engagement portion of the brush against the internal splines of the first drive element.

19. The method according to claim 17, wherein:
the first drive element comprises an annular internal shoulder; and
releasably coupling the brush with the first drive element comprises inserting the brush into the first drive element until the brush contacts the annular internal shoulder.

20. The method according to claim 1, wherein opening the valve enables the glutinous substance to flow from the valve into a substance-delivery tube, communicatively coupled to the brush.

21. The method according to claim 1, wherein rotating the first drive element comprises rotating a second drive element, co-rotatably coupled with the first drive element via a power-transmission component.

22. The method according to claim 1, further comprising selectively adjusting a position of the brush relative to the motor while maintaining a constant distance between the brush and the motor.

23. The method according to claim 1, wherein:
the first drive element comprises internal splines; and
releasably coupling the brush with the first drive element comprises at least partially deforming an engagement portion of the brush against the internal splines of the first drive element.

* * * * *